(12) United States Patent
Han et al.

(10) Patent No.: US 10,805,927 B2
(45) Date of Patent: Oct. 13, 2020

(54) APPARATUS AND METHOD FOR TRANSMITTING DATA IN WIRELESS NETWORK

(71) Applicant: HUAWEI TECHNOLOGIES CO., LTD., Shenzhen, Guangdong (CN)

(72) Inventors: Guanglin Han, Beijing (CN); Xiaolong Guo, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 586 days.

(21) Appl. No.: 15/417,976

(22) Filed: Jan. 27, 2017

(65) Prior Publication Data
US 2017/0142730 A1    May 18, 2017

Related U.S. Application Data

(63) Continuation of application No. PCT/CN2014/083582, filed on Aug. 1, 2014.

(51) Int. Cl.
*H04W 72/04* (2009.01)
*H04L 12/825* (2013.01)
(Continued)

(52) U.S. Cl.
CPC ....... *H04W 72/0453* (2013.01); *H04L 5/0044* (2013.01); *H04L 47/26* (2013.01);
(Continued)

(58) Field of Classification Search
None
See application file for complete search history.

(56) References Cited

U.S. PATENT DOCUMENTS

2003/0031203 A1* 2/2003 Fukui ............... H04L 1/1607
370/469
2004/0160937 A1* 8/2004 Jiang ............... H04L 1/1628
370/349
(Continued)

FOREIGN PATENT DOCUMENTS

CN   1416659 A   5/2003
CN   1946083 A   4/2007
(Continued)

OTHER PUBLICATIONS

Chinese Office Action dated May 29, 2018 in corresponding Chinese Patent Application No. 201480032384.3, 8 pgs.
(Continued)

*Primary Examiner* — Hassan A Phillips
*Assistant Examiner* — Gautam Sharma
(74) *Attorney, Agent, or Firm* — Slater Matsil, LLP

(57) ABSTRACT

An apparatus and a method for transmitting data are included in a wireless network. The apparatus for transmitting data in a wireless network receives a status data packet sent by an upper layer, where the status data packet includes status information of the transmit end in a current status; discards, when there is a cached previous-status data packet, the previous-status data packet and caches the status data packet, where the previous-status data packet includes status information of the transmit end in a previous status; and sends the status data packet to a receive end when obtaining a sending resource, where the previous-status data packet and the status data packet have a same feature. In this way, a data packet delay is reduced; and in an application scenario of the Internet of Vehicles, timely data exchange between vehicles is ensured, and vehicle driving safety is improved.

18 Claims, 13 Drawing Sheets

(51) Int. Cl.
  *H04W 28/02* (2009.01)
  *H04W 76/14* (2018.01)
  *H04L 5/00* (2006.01)
  *H04W 4/70* (2018.01)
  *H04W 84/18* (2009.01)

(52) U.S. Cl.
  CPC ............ *H04W 4/70* (2018.02); *H04W 28/02* (2013.01); *H04W 72/042* (2013.01); *H04W 76/14* (2018.02); *H04W 72/0486* (2013.01); *H04W 84/18* (2013.01)

(56) References Cited

U.S. PATENT DOCUMENTS

| | | | | |
|---|---|---|---|---|
| 2006/0077892 | A1* | 4/2006 | Jiang | H04L 1/1832 370/229 |
| 2007/0177608 | A1* | 8/2007 | Ding | H04L 69/22 370/395.6 |
| 2009/0103445 | A1* | 4/2009 | Sammour | H04L 1/1812 370/252 |
| 2010/0034187 | A1* | 2/2010 | Kumar | H04L 47/14 370/345 |
| 2010/0136963 | A1* | 6/2010 | Yi | H04L 1/1877 455/422.1 |
| 2012/0057546 | A1* | 3/2012 | Wang | H04L 1/1835 370/329 |
| 2013/0114446 | A1* | 5/2013 | Liu | H04W 24/10 370/252 |
| 2014/0169320 | A1* | 6/2014 | Yi | H04W 24/10 370/329 |
| 2015/0264615 | A1* | 9/2015 | Zhao | H04W 72/0406 370/329 |
| 2015/0304903 | A1* | 10/2015 | Uchino | H04W 80/02 370/331 |
| 2015/0327236 | A1* | 11/2015 | Lin | H04W 72/0406 370/329 |
| 2016/0249232 | A1* | 8/2016 | Uchino | H04W 80/02 |
| 2016/0277154 | A1* | 9/2016 | Quan | H04L 47/34 |
| 2018/0211216 | A1* | 7/2018 | Lau | G06F 11/3013 |

FOREIGN PATENT DOCUMENTS

| | | | |
|---|---|---|---|
| CN | 1964362 | A | 5/2007 |
| CN | 101478787 | A | 7/2009 |
| CN | 101557645 | A | 10/2009 |
| CN | 101631353 | B * | 8/2011 |
| CN | 102724663 | A | 10/2012 |
| CN | 102932115 | A | 2/2013 |
| CN | 103501543 | A | 1/2014 |
| CN | 103746938 | A | 4/2014 |
| EP | 2418810 | A1 | 2/2012 |
| EP | 2 731 391 | A1 | 5/2014 |
| EP | 2928232 | A1 | 10/2015 |
| WO | 2009046041 | A2 | 4/2009 |
| WO | 2013048049 | A1 | 4/2013 |
| WO | 2014084062 | A1 | 6/2014 |

OTHER PUBLICATIONS

Partial Supplementary European Search Report, dated Jul. 31, 2017, in European Application No. 14898965.0 (11 pp.).
International Search Report dated Apr. 20, 2015 in corresponding International Application No. PCT/CN2014/083582.
International Search Report dated Apr. 20, 2015 in corresponding International Patent Application No. PCT/CN2014/083582.
Xu et al.,"Layer-2 Protocol Design for Vehicle Safety Communications in Dedicated Short Range Communications Spectrum", 2004 IEEE Intelligent Transportation Systems Conference, Oct. 36, 2004, 6 pages, Washington, D.C., USA.

* cited by examiner

Protocol stack of a transmit end

APPARATUS AND METHOD FOR TRANSMITTING DATA IN WIRELESS NETWORK

CROSS-REFERENCE TO RELATED APPLICATION

This application is a continuation of International Application No. PCT/CN 2014/083582, filed on Aug. 1, 2014, the disclosure of which is hereby incorporated by reference in its entirety.

TECHNICAL FIELD

The present disclosure relates to the communications field, and in particular, to a method and an apparatus for transmitting data in a wireless network.

BACKGROUND

The Internet of Vehicles (IoV) is a new management service network based on a combination of technologies of the Internet and the Internet of Things and integrated with a large quantity of software technologies and information service content. With rapid development of the economic society, a quantity of vehicles in China increases rapidly, which causes frequent road traffic accidents. Therefore, road traffic safety has become one of the basic issues that affect social harmony and improvement of people's livelihood.

In an existing Long Term Evolution (LTE) communications technology, a data channel is transmitted by using a two-layer transmission protocol, that is, a Layer 1 physical layer and a Layer 2 that includes a PDCP layer, an RLC layer, and a MAC layer. A transmit end (TX) transfers, to the PDCP layer, a service data packet (SDU) that is from an upper layer (for example, an application layer). After performing processing, for example, operations such as encryption, integrity protection, and header compression on the data, the PDCP layer sends a processed data packet (PDCP PDU) to a lower RLC layer. For a data packet using a PDCP transparent transmission mode, the upper-layer data packet (SDU) is directly transferred to the RLC layer of the transmit end. After receiving the data packet that is from the upper layer, the RLC layer caches the data packet. After the MAC layer has a transmission resource, the RLC layer encapsulates the cached data packet into an RLC PDU according to a receiving sequence and sends the RLC PDU to the MAC layer. After receiving the RLC PDU, the MAC layer encapsulates the RLC PDU into a MAC PDU and transmits the MAC PDU to a receive end (RX) through the PHY layer.

However, if the existing LTE communications technology is directly applied to the Internet of Vehicles, when vehicle traveling information is exchanged between vehicles by using an existing data transmission mechanism, a data packet delay may be easily caused. As a result, the vehicle traveling information is not updated in time, and vehicle driving safety is reduced.

SUMMARY

The present invention provides an apparatus and a method for transmitting data in a wireless network, so as to reduce a delay in transmission of vehicle traveling data, to improve vehicle driving safety.

According to a first aspect, the present invention provides an apparatus for transmitting data in a wireless network, including:

a processing module, configured to receive a status data packet sent by an upper layer, where the status data packet includes status information of the transmit end in a current status; and further configured to: discard, by the transmit end when there is a cached previous-status data packet, the previous-status data packet and cache the status data packet, where the previous-status data packet includes status information of the transmit end in a previous status; and a sending module, configured to send the status data packet to a receive end when obtaining a sending resource, where the previous-status data packet and the status data packet have a same feature.

With reference to the first aspect, in a first possible implementation manner, the feature of the status data packet includes any one or any combination of the following parameters: a data flow identifier of the status data packet, a type of the status data packet, an event identifier corresponding to the status data packet, and a transmit end action identifier.

With reference to the first aspect or the first possible implementation manner of the first aspect, in a second possible implementation manner, the transmit end is further configured to: before discarding, by the transmit end when there is the cached previous-status data packet, the previous-status data packet and caching the status data packet, obtain feature configuration information; and bind the type of the status data packet to a corresponding logical channel according to the feature configuration information, where the feature configuration information is used to indicate a correspondence between a feature of the status data packet and a logical channel.

With reference to the second possible implementation manner of the first aspect, in a third possible implementation manner, the processing module is specifically configured to preset the feature configuration information; or the apparatus further includes:

a receiving module, configured to receive the feature configuration information sent by a base station.

With reference to any one of the foregoing possible implementation manners of the first aspect, in a fourth possible implementation manner, the receiving module is further configured to receive a capability query message sent by the base station, where the capability query message is used to query whether the transmit end has a function of binding the feature of the status data packet to the corresponding logical channel, and/or a function of supporting, by the corresponding logical channel, the transmit end in discarding the previous-status data packet; and the sending module is further configured to send a capability query response message, where the capability query response message includes a supported function indication, and the supported function indication is used to indicate that the transmit end has the function.

With reference to the third possible implementation manner of the first aspect or the fourth possible implementation manner of the first aspect, in a fifth possible implementation manner, the processing module is further configured to: after binding the type of the status data packet to the corresponding logical channel according to the feature configuration information, identify the feature of the status data packet; determine, according to the feature configuration information and the feature of the status data packet, the logical channel corresponding to the feature of the status data packet; and determine whether the previous-status data is cached in the corresponding logical channel; where if the previous-status data packet does not exist in the corresponding logical channel, the status data packet is cached; or if the previous-status data packet is cached in the corresponding logical channel, the transmit end discards the previous-status data packet and caches the status data packet.

According to a second aspect, the present invention provides a spectrum resource allocation apparatus, including:

a processing module, configured to determine a VDC spectrum resource and an LTE spectrum resource according to load information of a VDC spectrum, and generate VDC spectrum communication information and LTE spectrum communication information according to the VDC spectrum resource and the LTE spectrum resource; and a transmission module, configured to deliver the VDC spectrum communication information generated by the processing module to a vehicle in a network coverage area, and deliver the LTE spectrum communication information generated by the processing module to user equipment UE in the network coverage area.

With reference to the second aspect, in a first possible implementation manner, the processing module is specifically configured to allocate an idle VDC spectrum resource to LTE communication for use when load of the VDC vehicle communication is less than a VDC load threshold; or allocate an idle LTE spectrum resource to the VDC vehicle communication for use when a load of the VDC vehicle communication is greater than or equal to the VDC load threshold and load of LTE communication is less than an LTE load threshold.

With reference to the second aspect or the first possible implementation manners of the second aspect, in a second possible implementation manner, the transmission module is specifically configured to broadcast the VDC spectrum communication information on an LTE spectrum and deliver the VDC spectrum communication information to the vehicle in the network coverage area; or the apparatus further includes:

a receiving module, configured to receive, on the LTE spectrum, a first access request message sent by the vehicle in the network coverage area, where the first access request message is used to request the VDC spectrum communication information; and the transmission module is further specifically configured to send, on the LTE spectrum, a first access response message to the vehicle in the network coverage area, where the first access response message includes the VDC spectrum communication information; or the transmission module is further specifically configured to broadcast first access information on the LTE spectrum, where the first access information is used to instruct the vehicle in the network coverage area to send the first access request message;

the receiving module is further configured to receive, on the LTE spectrum, the first access request message sent by the vehicle in the network coverage area; and the transmission module is further specifically configured to send, on the LTE spectrum, an access response message to the vehicle in the network coverage area, where the access response message includes the VDC spectrum communication information.

With reference to the second aspect or the first possible implementation manners of the second aspect, in a third possible implementation manner, the transmission module is specifically configured to broadcast the VDC spectrum communication information on a VDC spectrum and deliver the VDC spectrum communication information to the vehicle in the network coverage area; or the receiving module is further configured to receive, on the VDC spectrum, a second access request message sent by the vehicle in the network coverage area, where the second access request message is used to request the VDC spectrum communication information; and the transmission module is further specifically configured to send, on the VDC spectrum, a second access response message to the vehicle in the network coverage area, where the second access response message includes the VDC spectrum communication information.

With reference to the second aspect or the first possible implementation manner of the second aspect, in a fourth possible implementation manner, the VDC spectrum communication information includes first-part VDC spectrum communication information and second-part VDC spectrum communication information, and the first-part VDC spectrum communication information is used to instruct the vehicle in the network coverage area to obtain the second-part VDC spectrum communication information;

the transmission module is further specifically configured to broadcast the first-part VDC spectrum communication information on an LTE spectrum and deliver the first-part VDC spectrum communication information to the vehicle in the network coverage area; and the transmission module is further specifically configured to broadcast the second-part VDC spectrum communication information on a VDC spectrum and deliver the second-part VDC spectrum communication information to the vehicle in the network coverage area; or the receiving module is further configured to receive, on the LTE spectrum, a third access request message sent by the vehicle in the network coverage area, where the third access request message is used to request the first-part VDC spectrum communication information;

the transmission module is further specifically configured to send, on the LTE spectrum, a third access response message to the vehicle in the network coverage area, where the third access response message includes the first-part VDC spectrum communication information; and the transmission module is further specifically configured to broadcast the second-part VDC spectrum communication information on the VDC spectrum and deliver the second-part VDC spectrum communication information to the vehicle in the network coverage area; or the transmission module is further specifically configured to broadcast the first-part VDC spectrum communication information on the LTE spectrum and deliver the first-part VDC spectrum communication information to the vehicle in the network coverage area;

the transmission module is further specifically configured to receive, on the VDC spectrum, a fourth access request message sent by the vehicle in the network coverage area, where the fourth access request message is used to request the VDC spectrum communication information; and the transmission module is further specifically configured to send, on the VDC spectrum, a fourth access response message to the vehicle in the network coverage area, where the fourth access response message includes the VDC spectrum communication information; or the receiving module is further configured to receive, on the LTE spectrum, the third access request message sent by the vehicle in the network coverage area;

the transmission module is further specifically configured to send, on the LTE spectrum, the third access response message to the vehicle in the network coverage area;

the receiving module is further configured to receive, on the VDC spectrum, the fourth access request message sent by the vehicle in the network coverage area; and the transmission module is further specifically configured to send, on the VDC spectrum, the fourth access response message to the vehicle in the network coverage area.

With reference to the second aspect or any one of the foregoing possible implementation manners of the second aspect, in a fifth possible implementation manner, the VDC spectrum communication information at least includes frequency channel number information of the VDC spectrum communication, spectrum information of the VDC spectrum communication, and bandwidth information of the VDC spectrum communication.

According to a third aspect, the present invention provides an apparatus for transmitting data in a wireless network, including:

a processor, configured to receive a status data packet sent by an upper layer, where the status data packet includes status information of the transmit end in a current status; and further configured to: discard, when there is a cached previous-status data packet, the previous-status data packet and cache the status data packet, where the previous-status data packet includes status information of the transmit end in a previous status; and a transmitter, configured to send the status data packet to a receive end when obtaining a sending resource, where the previous-status data packet and the status data packet have a same feature.

According to a fourth aspect, the present invention provides a spectrum resource allocation apparatus, including:

a processing module, configured to determine a VDC spectrum resource and an LTE spectrum resource according to load information of a VDC spectrum, and generate VDC spectrum communication information and LTE spectrum communication information according to the VDC spectrum resource and the LTE spectrum resource; and a transmitter, configured to deliver the VDC spectrum communication information generated by the processor to a vehicle in a network coverage area, and deliver the LTE spectrum communication information generated by the processing module to user equipment UE in the network coverage area.

According to a fifth aspect, the present invention provides a method for transmitting data in a wireless network, including:

receiving, by a transmit end, a status data packet sent by an upper layer, where the status data packet includes status information of the transmit end in a current status;

discarding, by the transmit end when there is a cached previous-status data packet, the previous-status data packet and caching the status data packet, where the previous-status data packet includes status information of the transmit end in a previous status; and sending, by the transmit end, the status data packet to a receive end when obtaining a sending resource, where the previous-status data packet and the status data packet have a same feature.

With reference to the fifth aspect, in a first possible implementation manner, the feature of the status data packet includes any one or any combination of the following parameters: a data flow identifier of the status data packet, a type of the status data packet, an event identifier corresponding to the status data packet, and a transmit end action identifier.

With reference to the fifth aspect or a first possible implementation manner of the fifth aspect, in a second possible implementation manner, before the discarding, by the transmit end when there is a cached previous-status data packet, the previous-status data packet and caching the status data packet, the method further includes:

obtaining, by the transmit end, feature configuration information, where the feature configuration information is used to indicate a correspondence between a feature of the status data packet and a logical channel; and binding, by the transmit end, the type of the status data packet to a corresponding logical channel according to the feature configuration information.

With reference to the second possible implementation manner of the fifth aspect, in a third possible implementation manner, the obtaining, by the transmit end, feature configuration information includes:

presetting, by the transmit end, the feature configuration information; or receiving, by the transmit end, the feature configuration information sent by a base station.

With reference to any one of the foregoing feasible implementation manners of the fifth aspect, in a fourth possible implementation manner, before the obtaining, by the transmit end, feature configuration information, the method further includes:

receiving, by the transmit end, a capability query message sent by the base station, where the capability query message is used to query whether the transmit end has a function of binding the feature of the status data packet to the corresponding logical channel, and/or a function of supporting, by the corresponding logical channel, the transmit end in discarding the previous-status data packet; and sending, by the transmit end, a capability query response message, where the capability query response message includes a supported function indication, and the supported function indication is used to indicate that the transmit end has the function.

With reference to the third possible implementation manner of the fifth aspect or the fourth possible implementation manner of the fifth aspect, in a fifth possible implementation manner, after the binding, by the transmit end, the type of the status data packet to a corresponding logical channel according to the feature configuration information, the method further includes:

identifying, by the transmit end, the feature of the status data packet;

determining, by the transmit end according to the feature configuration information and the feature of the status data packet, the logical channel corresponding to the feature of the status data packet; and determining, by the transmit end, whether the previous-status data is cached in the corresponding logical channel; where if the previous-status data packet does not exist in the corresponding logical channel, the status data packet is cached; or if the previous-status data packet is cached in the corresponding logical channel, the transmit end discards the previous-status data packet and caches the status data packet.

According to a sixth aspect, the present invention provides a spectrum resource allocation method, including:

determining a VDC spectrum resource and an LTE spectrum resource according to load information of a VDC spectrum;

generating VDC spectrum communication information and LTE spectrum communication information according to the VDC spectrum resource and the LTE spectrum resource; and delivering the VDC spectrum communication information to a vehicle in a network coverage area and delivering the LTE spectrum communication information to user equipment UE in the network coverage area.

With reference to the sixth aspect, in a first possible implementation manner, the determining a VDC spectrum resource and an LTE spectrum resource according to load information of a VDC spectrum includes:

allocating an idle VDC spectrum resource to LTE communication for use when load of the VDC vehicle communication is less than a VDC load threshold; or allocating an idle LTE spectrum resource to the VDC vehicle communication for use when a load of the VDC vehicle communication is greater than or equal to the VDC load threshold and load of LTE communication is less than an LTE load threshold.

With reference to the sixth aspect or the first possible implementation manner of the sixth aspect, in a second possible implementation manner, the delivering the VDC spectrum communication information to a vehicle in a network coverage area includes:

broadcasting the VDC spectrum communication information on an LTE spectrum and delivering the VDC spectrum communication information to the vehicle in the network coverage area; or receiving, on the LTE spectrum, a first access request message sent by the vehicle in the network coverage area, where the first access request message is used to request the VDC spectrum communication information; and sending, on the LTE spectrum, a first access response message to the vehicle in the network coverage area, where the first access response message includes the VDC spectrum communication information; or broadcasting first access information on the LTE spectrum, where the first access information is used to instruct the vehicle in the network coverage area to send the first access request message;

receiving, on the LTE spectrum, the first access request message sent by the vehicle in the network coverage area; and sending, on the LTE spectrum, an access response message to the vehicle in the network coverage area, where the access response message includes the VDC spectrum communication information.

With reference to the sixth aspect or the first possible implementation manner of the sixth aspect, in a third possible implementation manner, the delivering the VDC spectrum communication information to a vehicle in a network coverage area includes:

broadcasting the VDC spectrum communication information on a VDC spectrum and delivering the VDC spectrum communication information to the vehicle in the network coverage area; or receiving, on the VDC spectrum, a second access request message sent by the vehicle in the network coverage area, where the second access request message is used to request the VDC spectrum communication information; and sending, on the VDC spectrum, a second access response message to the vehicle in the network coverage area, where the second access response message includes the VDC spectrum communication information.

With reference to the sixth aspect or the first possible implementation manner of the sixth aspect, in a fourth possible implementation manner, the VDC spectrum communication information includes first-part VDC spectrum communication information and second-part VDC spectrum communication information, and the first-part VDC spectrum communication information is used to instruct the vehicle in the network coverage area to obtain the second-part VDC spectrum communication information; and the delivering the VDC spectrum communication information to a vehicle in a network coverage area includes:

broadcasting the first-part VDC spectrum communication information on an LTE spectrum and delivering the first-part VDC spectrum communication information to the vehicle in the network coverage area; and broadcasting the second-part VDC spectrum communication information on a VDC spectrum and delivering the second-part VDC spectrum communication information to the vehicle in the network coverage area; or receiving, on the LTE spectrum, a third access request message sent by the vehicle in the network coverage area, where the third access request message is used to request the first-part VDC spectrum communication information;

sending, on the LTE spectrum, a third access response message to the vehicle in the network coverage area, where the third access response message includes the first-part VDC spectrum communication information; and broadcasting the second-part VDC spectrum communication information on the VDC spectrum and delivering the second-part VDC spectrum communication information to the vehicle in the network coverage area; or broadcasting the first-part VDC spectrum communication information on the LTE spectrum and delivering the first-part VDC spectrum communication information to the vehicle in the network coverage area;

receiving, on the VDC spectrum, a fourth access request message sent by the vehicle in the network coverage area, where the fourth access request message is used to request the VDC spectrum communication information; and sending, on the VDC spectrum, a fourth access response message to the vehicle in the network coverage area, where the fourth access response message includes the VDC spectrum communication information; or receiving, on the LTE spectrum, the third access request message sent by the vehicle in the network coverage area;

sending, on the LTE spectrum, the third access response message to the vehicle in the network coverage area;

receiving, on the VDC spectrum, the fourth access request message sent by the vehicle in the network coverage area; and sending, on the VDC spectrum, the fourth access response message to the vehicle in the network coverage area.

With reference to the sixth aspect or any one of the foregoing possible implementation manners of the sixth aspect, in a fifth possible implementation manner, the VDC spectrum communication information at least includes frequency channel number information of the VDC spectrum communication, spectrum information of the VDC spectrum communication, and bandwidth information of the VDC spectrum communication.

The present invention provides the apparatus and the method for transmitting data in a wireless network. A transmit end receives a status data packet sent by an upper layer, where the status data packet includes status information of the transmit end in a current status; when there is a cached previous-status data packet, the transmit end discards the previous-status data packet and caches the status data packet, where the previous-status data packet includes status information of the transmit end in a previous status; and the transmit end sends the status data packet to a receive end when obtaining a sending resource, where the previous-status data packet and the status data packet have a same feature.

The following technical problem in the prior art is resolved: Updated data needs to be sent after previous data during data transmission, causing a data packet delay; further, in an application scenario of the Internet of Vehicles, vehicle traveling information is not updated in time, and vehicle driving safety is reduced.

Compared with the prior art, the present invention provides an apparatus and a method for transmitting data in a wireless network. Therefore, a data packet delay is reduced; in an application scenario of the Internet of Vehicles, timely data exchange between vehicles is ensured, and vehicle driving safety is improved

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
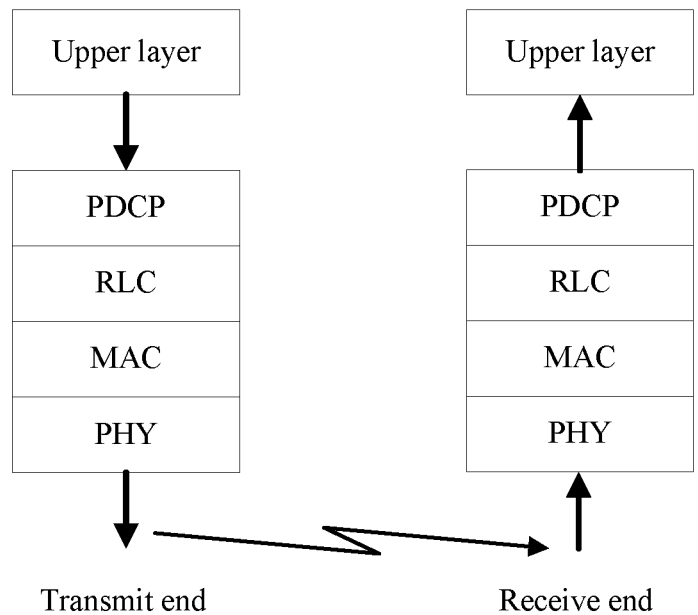
FIG. 1 is a system architecture diagram for LTE data transmission.

In an existing LTE technology, a data channel is transmitted by using a two-layer transmission protocol, that is, the first layer is a physical layer (Layer 1), and the second layer (Layer 2) includes a Packet Data Convergence Protocol (PDCP) entity (Entity), a Radio Link Control (RLC) entity, and a Media Access Control (MAC) entity. FIG. 1 is a system architecture diagram for LTE data transmission. Referring to FIG. 1, a transmit end (TX) transfers a data packet (SDU) that is from an upper layer (Upper Layer, for example, an application layer), to a PDCP entity, and after performing processing such as encryption, integrity protection, and header suppression on the data, the PDCP entity sends a processed data packet (PDCP PDU) to a lower RLC entity. For a data packet using a PDCP transparent transmission mode, the upper-layer data packet (SDU) is directly transferred to an RLC entity of the transmit end. After receiving the data packet that is from the upper layer, the RLC entity caches the data packet, and after the MAC layer has a transmission resource, the RLC entity encapsulates the cached data packet into an RLC PDU according to a receiving sequence and sends the RLC PDU to the MAC entity. After receiving the RLC PDU, the MAC entity encapsulates the RLC PDU into a MAC PDU, sends the MAC PDU to a physical (protocol) layer (PHY), and transmits the MAC PDU to a receive end (RX) by using the physical layer.

Figure 2:
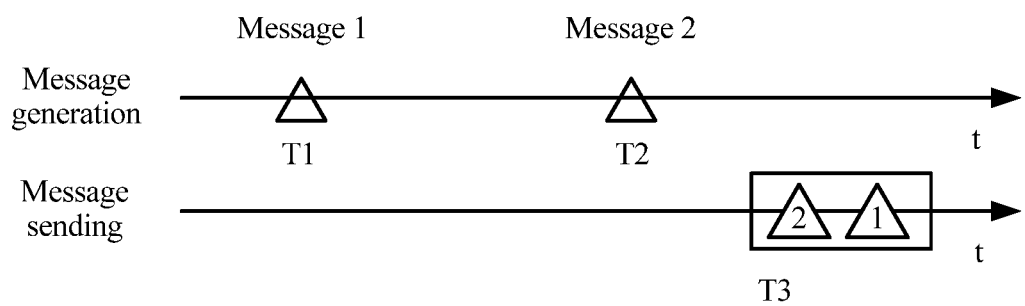
FIG. 2 is a schematic diagram of data transmission in the prior art.

Further, FIG. 2 is a schematic diagram of data transmission in the prior art. Referring to FIG. 2, in an Internet of Vehicles scenario, an upper layer of user equipment carried by a vehicle A transfers a message 1 to an RLC entity at moment T1. When no transmission resource for a MAC entity is obtained, the message 1 is cached in the RLC entity.

The upper layer sends a message 2 to the RLC entity at moment T2. When no transmission resource for the MAC entity is obtained, the message 2 is cached in the RLC entity. The RLC entity obtains a transmission resource for the MAC entity at moment T3 and sends the message 1 and the message 2 to a receive end (vehicle B). Actually, the message 2 is a status update message of the message 1. After receiving the message 2, the receive end updates, according to content carried by the message 2, a status of the vehicle B after receiving the message 1. In this transmission process, the MAC entity of the transmit end obtains transmission resources for both the message 1 and the message 2, causing a waste of a transmission resource. In addition, in a sequential sending manner, the transmit end cannot send the message 2 before sending the message 1; therefore the status update message (the message 2) of the vehicle A may be delayed, and a status of the vehicle B is not updated in time, which brings a safety risk.

Therefore, in view of a problem in the prior art of lack of safety caused by a large transmission delay in an application scenario of the Internet of Vehicles, embodiments of the present invention provide an apparatus and a method for transmitting data in a wireless network. The following gives a description with reference to specific embodiments.

Figure 3:
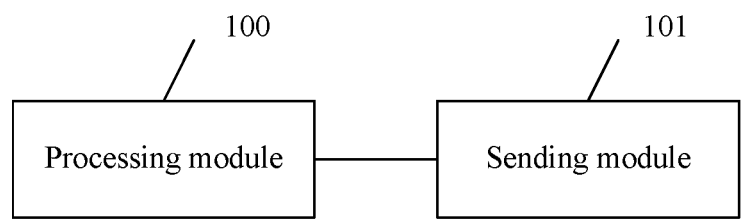
FIG. 3 shows an apparatus for transmitting data in a wireless network according to an embodiment of the present invention.

FIG. 3 shows an apparatus for transmitting data in a wireless network according to an embodiment of the present invention. The apparatus may be a terminal device, for example, may be an onboard device (such as OBD) disposed on a vehicle, or a medical device or motion assistant device worn by a patient, and needs to obtain current body information such as blood pressure and heartbeat in time. In this information transmission process, the latest body status information needs to be obtained. Therefore, if a first message is not sent after a second message is generated, the first message needs to be replaced with the second message to satisfy a low-delay transmission requirement of the latest status information and reduce network overheads. Unless otherwise described, the following uses only the Internet of Vehicles as an example, that is, the apparatus for transmitting data in a wireless network is an onboard device disposed on the vehicle. Referring to FIG. 3, the apparatus includes a processing module 100 and a sending module 101.

The processing module 100 is configured to receive a status data packet sent by an upper layer, where the status data packet includes status information of the transmit end in a current status; and further configured to: discard, by the transmit end when there is a cached previous-status data packet, the previous-status data packet and cache the status data packet, where the previous-status data packet includes status information of the transmit end in a previous status.

The sending module 101 is configured to send the status data packet to a receive end when obtaining a sending resource.

The previous-status data packet and the status data packet have a same feature.

According to the apparatus for transmitting data in a wireless network provided in this embodiment, a processing module receives a status data packet sent by an upper layer, where the status data packet includes status information of the transmit end in a current status; and is further configured to discard, by the transmit end when there is a cached previous-status data packet, the previous-status data packet and cache the status data packet, where the previous-status data packet includes status information of the transmit end in a previous status. Further, when obtaining a sending resource, a sending module sends the status data packet to a receive end. When applied to an Internet of Vehicles scenario, the apparatus can avoid a delay in data exchange between vehicles, and update vehicle traveling data in time, thereby improving vehicle driving safety. In addition, a resource can be saved because the sending module no longer needs to send the previous-status data packet to the receive end.

Optionally, the feature of the status data packet includes any one or any combination of the following parameters: a data flow identifier of the status data packet, a type of the status data packet, an event identifier corresponding to the status data packet, and a transmit end action identifier.

Preferably, the processing module 100 is further configured to: before discarding, by the transmit end when there is the cached previous-status data packet, the previous-status data packet and caching the status data packet, obtain feature configuration information; and bind the type of the status data packet to a corresponding logical channel according to the feature configuration information, where the feature configuration information is used to indicate a correspondence between a feature of the status data packet and a logical channel.

Specifically, the feature configuration information may be a segment of identifier, with a purpose of making the transmit end learn a status data packet whose feature needs to be identified by the transmit end, and is further used to indicate the correspondence between the feature of the status data packet and the logical channel. Therefore, after identifying the feature of the status data packet, the transmit end processes the status data packet on a corresponding logical channel according to the correspondence between the feature of the status data packet and the logical channel. For example, the feature configuration information is 00101, where "0" indicates not identifying a feature of a corresponding status data packet, and "1" indicates that it is required to identify a feature of a corresponding status data packet. "1" is corresponding to the type of the status data packet and the transmit end action identifier, so that the processing module 100 identifies the feature of the status data packet based on the feature configuration information, and when identifying the type of the status data packet and the transmit end action identifier, processes the status data packet on a logical channel corresponding to the type of the status data packet and the transmit end action identifier. Actually, in this way, a function of identifying a status data packet based on a feature of the status data packet is implemented. Further, the logical channel provided in this embodiment has a data packet replacement function. Therefore, in a corresponding logical channel, if there is a cached previous-status data packet, the data packet replacement function can be implemented, and a technical effect of the foregoing embodiment is achieved.

Optionally, there may be the following two possible implementation manners of obtaining the feature configuration information.

Manner 1: The processing module 100 is specifically configured to preset the feature configuration information.

Figure 4:
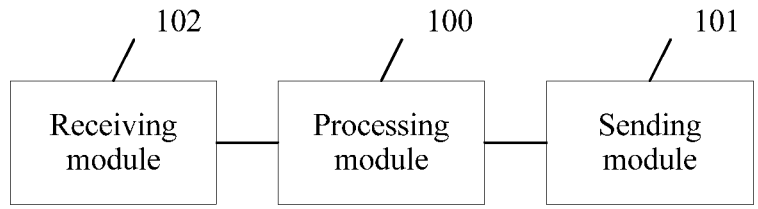
FIG. 4 shows another apparatus for transmitting data in a wireless network according to an embodiment of the present invention.

FIG. 4 shows another apparatus for transmitting data in a wireless network according to an embodiment of the present invention. Referring to FIG. 4, the apparatus further includes a receiving module 102.

The receiving module 102 is configured to receive the feature configuration information sent by a base station.

Further, before data packet replacement, the base station in a coverage area of the apparatus may need to perform capability negotiation with the apparatus, so as to allocate corresponding feature configuration information to the apparatus based on a capability of the apparatus. Based on this scenario, the apparatus for transmitting data in a wireless network provided in this embodiment further has the following functions:

The receiving module 102 is further configured to receive a capability query message sent by the base station, where the capability query message is used to query whether the transmit end has a function of binding the feature of the status data packet to the corresponding logical channel, and/or a function of supporting, by the corresponding logical channel, the transmit end in discarding the previous-status data packet.

The sending module 101 is further configured to send a capability query response message, where the capability query response message includes a supported function indication, and the supported function indication is used to indicate that the transmit end has the function.

Further, the processing module 100 is further configured to: after binding the type of the status data packet to the corresponding logical channel according to the feature configuration information, identify the feature of the status data packet; determine, according to the feature configuration information and the feature of the status data packet, the logical channel corresponding to the feature of the status data packet; and determine whether the previous-status data is cached in the corresponding logical channel; where if the previous-status data packet does not exist in the corresponding logical channel, the status data packet is cached; or if the previous-status data packet is cached in the corresponding logical channel, the transmit end discards the previous-status data packet and caches the status data packet.

Figure 5:
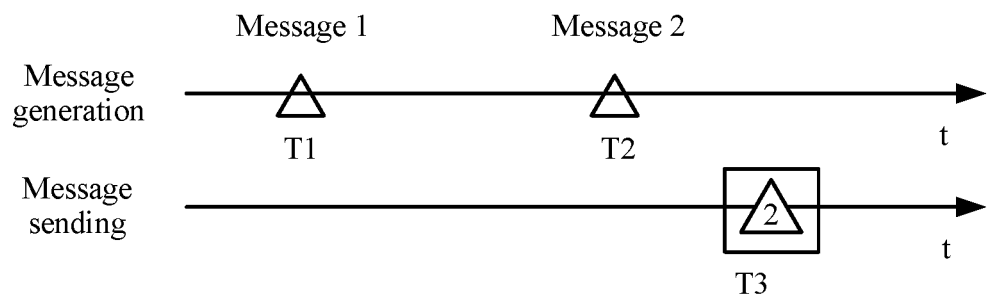
FIG. 5 is a schematic diagram of data transmission in a wireless network according to an embodiment of the present invention.

The following uses the Internet of Vehicles as an example to describe the apparatus for transmitting data in a wireless network provided in the foregoing embodiment. FIG. 5 is a schematic diagram of data transmission in a wireless network according to an embodiment of the present invention. A possible implementation manner is as follows:

Referring to FIG. 5, a message 1 is corresponding to the foregoing previous-status data packet, a message 2 is corresponding to the foregoing status data packet, and the apparatus for transmitting data in a wireless network serves as a transmit end.

Specifically, referring to FIG. 5, the functions of the apparatus for transmitting data in a wireless network are described by using a specific process.

Step 1: An upper layer (Upper Layer) of the transmit end (TX) generates a to-be-sent message (message 1) and sends the message 1 to an RLC entity of the transmit end.

Step 2: The RLC entity of the transmit end caches the message 1 into the RLC entity of the transmit end after receiving the message 1.

Step 3: A MAC entity of the transmit end starts to obtain a transmission resource for sending the message 1.

Step 4: The upper layer of the transmit end generates a to-be-sent message (message 2) and sends the message 2 to the RLC entity of the transmit end.

Step 5: After receiving the message 2, if the message 1 is in a cache and is not yet sent to an RX, the RLC entity of the transmit end discards the message 1 from the cache and caches the message 2 into the RLC entity of the transmit end.

Further, if the message 1 is not yet sent to the receive end, the RLC entity of the transmit end may determine whether the message 2 is a replacement message of the message 1. If the RLC entity of the transmit end determines that the message 2 is the replacement message of the message 1, the RLC entity of the transmit end discards the message 1 and caches the message 2 into the RLC entity of the transmit end; or if the RLC entity of the transmit end determines that the message 2 is not the replacement message of the message 1, the RLC entity of the transmit end caches the message 2 into the RLC entity of the transmit end and first sends the message 1 in sequence.

Further, the RLC entity of the transmit end may determine, according to the following rules, whether the message 2 is the replacement message of the message 1.

The message 2 and the message 1 include a same service data flow identifier, for example, a same service data flow ID, or a same IP address and/or port number and/or protocol type and/or service priority.

The message 2 and the message 1 have a same message type, for example, co-operative awareness messages.

Both the message 2 and the message 1 are decentralized environmental notification messages (Decentralized Environmental Notification Message) and include a same event identifier, action identifier, or message version.

Step 6: The MAC entity of the transmit end starts to obtain a transmission resource for sending the message 2.

Step 7: The MAC entity of the transmit end sends the message 2 cached in the RLC entity of the transmit end to the receive end (RX) after obtaining the transmission resource for the message 2.

Figure 6:
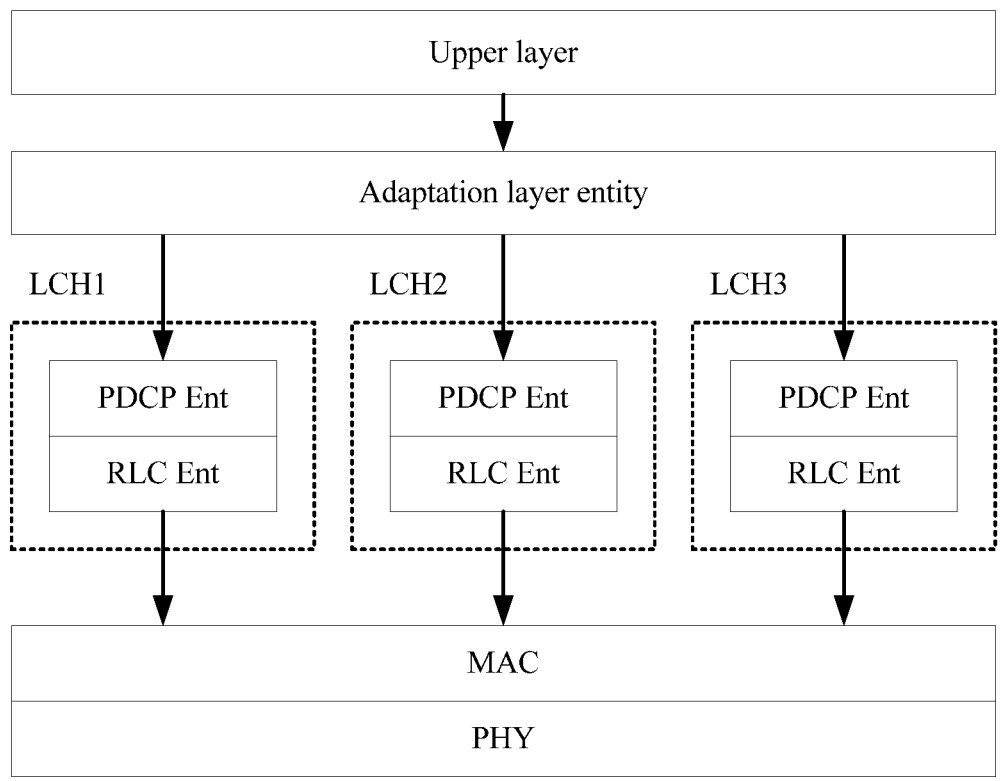
FIG. 6 is a schematic architectural diagram of a transmit end according to an embodiment of the present invention.

Preferably, an existing architecture of the transmit end may be optimized. Specifically, FIG. 6 is a schematic architectural diagram of a transmit end according to an embodiment of the present invention. Referring to FIG. 6, a difference from the existing architecture lies in that this architecture adds an adaptation layer (Adaptation Layer) between the upper layer and the PDCP entity/the RLC entity.

Figure 7:
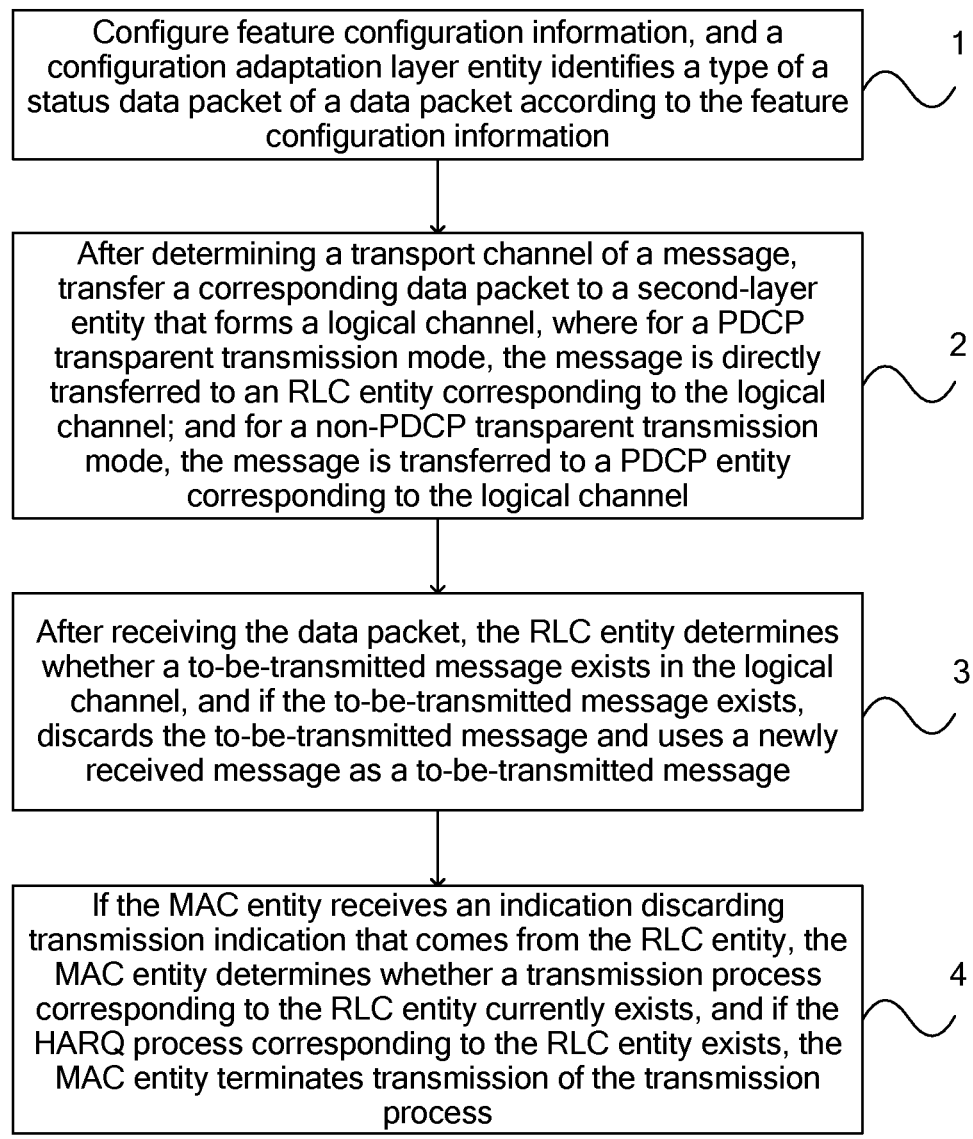
FIG. 7 is a schematic diagram of another type of data transmission in a wireless network according to an embodiment of the present invention.

Further, FIG. 7 is a schematic diagram of another type of data transmission in a wireless network according to an embodiment of the present invention. A procedure in FIG. 7 is based on the optimized architecture in FIG. 6. Referring to FIG. 7, the procedure includes the following steps:

Step 1: (AL Entity) Configure feature configuration information, and a configuration adaptation layer entity identifies a type of a status data packet according to the feature configuration information; for example, a message (or a data packet) that meets a type corresponding to the status data packet is transferred to a specific logical channel for transmission.

Specifically, the type of the status data packet includes: a service data flow identifier, for example, a same service data flow ID, or a same IP address and/or port number and/or protocol type and/or service priority;

a message type, for example, different message types are corresponding to different logical channels; and an event (Event) identifier or a transmit end action (Action) identifier corresponding to a message, for example, when a service data flow identifier carried by a received message is the same as a logical channel identifier corresponding to feature configuration information bound to a specific logical channel, the message is transferred to the logical channel for transmission.

For another example, when a message type carried by a received message is the same as a message type of a logical channel corresponding to feature configuration information bound to a specific logical channel, the message is transferred to the logical channel for transmission. For example, if a message type value corresponding to a message type indication of a CAM message is 2, the CAM message is sent to a logical channel transmitting the CAM message.

Step 2: After determining a transport channel of the message, transfer a corresponding data packet to a second-layer entity that forms the logical channel, where for a PDCP transparent transmission mode, the message is directly transferred to an RLC entity corresponding to the logical channel; and for a non-PDCP transparent transmission mode, the message is transferred to a PDCP entity corresponding to the logical channel.

If the message is transferred to the PDCP entity, after encapsulating the message into an RLC SDU, the PDCP entity sends the data packet to the RLC entity corresponding to the logical channel.

If the message is transferred to the RLC entity, the message is directly sent to the RLC entity corresponding to the logical channel as the RLC SDU.

Step 3: After receiving the data packet, the RLC entity determines whether a to-be-transmitted message exists in the logical channel, and if the to-be-transmitted message exists, discards the to-be-transmitted message and uses a newly received message as a to-be-transmitted message.

Further, if the RLC entity has sent the message to the MAC entity, the RLC entity instructs the MAC entity to discard a data packet that is being transmitted. For example, the RLC entity sends a packet discarding indication to the MAC entity.

Step 4: Further, if the MAC entity receives an discarding transmission indication that is from the RLC entity (logical channel, Logical Channel, LCH for short), the MAC entity determines whether a transmission process (HARQ Process) corresponding to the RLC entity currently exists, and if the HARQ process corresponding to the RLC entity exists, the MAC entity terminates the transmission process, for example, releases the process, and empties a data cache corresponding to the process.

It should be noted that in the foregoing embodiment, the RLC entity or the PDCP entity of the transmit end or both are corresponding to the processing module 100 in the apparatus shown in FIG. 3 and FIG. 4, and the MAC entity and a PHY entity of the transmit end are corresponding to the sending module 101 in the apparatus shown in FIG. 3 and FIG. 4. The transmit end can implement a function of the embodiment corresponding to FIG. 3 and FIG. 4 and achieve a corresponding effect.

Preferably, the transmit end needs to configure feature configuration information before transmitting data, and may configure, for the logical channel, an indication indicating whether to use a message replacement transmission mechanism. For example, if it is configured that the logical channel does not use the message replacement mechanism (or an indication of using the message replacement transmission mechanism is not configured), after receiving a new data packet, the RLC entity does not discard a previous data packet, but transmits the data packet in a sequential transmission manner according to an arrival sequence of the data packet.

Preferably, before the transmit end sends the status data packet based on a data transmission mechanism provided in this embodiment, a capability negotiation mechanism may further be introduced, so that the base station queries whether a terminal, as the transmit end, has a capability to establish a logical channel having the foregoing data packet replacement function. If the transmit end has the function, the base station configures configuration information of the logical channel having the function for the terminal, for example, an indication that the logical channel performs a message replacement operation in a data transmission process. Further, if the base station may further adjust, according to a vehicle dynamics control (Vehicle Dynamics Control, VDC for short) spectrum resource and/or a load status of an LTE spectrum resource, the configuration information allocated to the foregoing terminal. This adjustment function is described in the following specific embodiment, and is not described herein.

The capability negotiation mechanism is used as an example in the foregoing description, and is not described herein.

Figure 8:
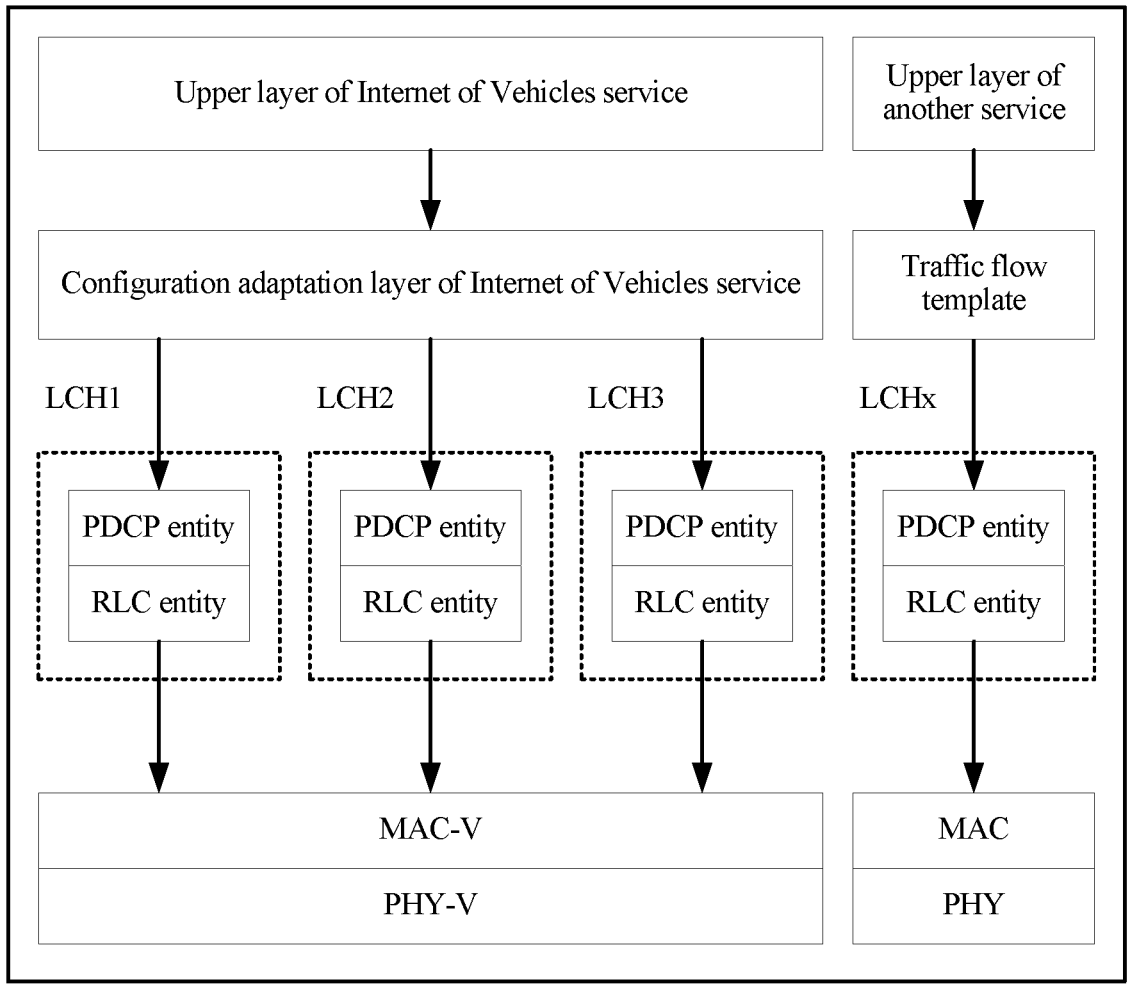
FIG. 8 is a schematic architectural diagram of a terminal according to an embodiment of the present invention.

With rapid development of the Internet of Vehicles, functions of a vehicular terminal device also become diverse. The device can implement not only service transmission of the Internet of Vehicles but also other services, such as surfing the Internet and a voice/video chat. Therefore, this embodiment of the present invention provides an architecture of a terminal to meet this requirement. FIG. 8 is a schematic diagram of an architecture of a terminal according to an embodiment of the present invention. Referring to FIG. 8, the architecture includes an architecture of an Internet of Vehicles service on the left side and an architecture of another service on the right side.

The architecture of the Internet of Vehicles includes the upper layer, the configuration adaptation layer entity, the PDCP entity/the RLC entity, the MAC layer, and the physical layer that are involved in the foregoing embodiment, and corresponding PDCP entities/RLC entities may be respectively set for multiple logical channels.

Specifically, a network configures or the terminal preconfigures [a traffic flow template for VDC communication (Traffic Flow Template for VDC, V-TFT for short) and a traffic flow template for V2V communication (Traffic Flow Template for V2V, V2V-TFT for short)] of the configuration adaptation entity. It should be noted that a specific implementation form of the V-TFT and the V2V-TFT may be the feature of the foregoing status data packet, so as to identify different V2V messages and filter the different V2V messages out to different vehicle logical channels such as an LCH1/2/3. For another service, the network configures or the terminal preconfigures a traffic flow template for IP transmission (Traffic Flow Template for IP, IP TFT for short). For example, an implementation form of the IP TFT may be a 5-tuple of a data packet, so as to identify other non-V2V service data and filter the non-V2V service data out to another logical channel. A format of the V2V-TFT has been described above, and is not described herein again. A V2V service may be transmitted by using a V2V-dedicated logical channel, where the logical channel is formed by a PDCP entity and an RLC entity that support V2V service transmission, such as implementing V2V message caching, sequential transmission, and a message replacement mechanism. The V2V service may be transmitted by using a V2V-dedicated transport channel, and the V2V service is transmitted by using an independent MAC entity, for example, to contend for and schedule a V2V data transmission resource. A physical layer (PHY) may be shared, or a V2V-dedicated PHY may be used to transmit the V2V service data. The architecture of the Internet of Vehicles service can implement the functions in the foregoing embodiment and achieve a corresponding effect, which is not described herein again.

The architecture of another service includes: an upper layer, a TFT, a PDCP entity/an RLC entity, a MAC layer, and a physical layer.

Figure 9:
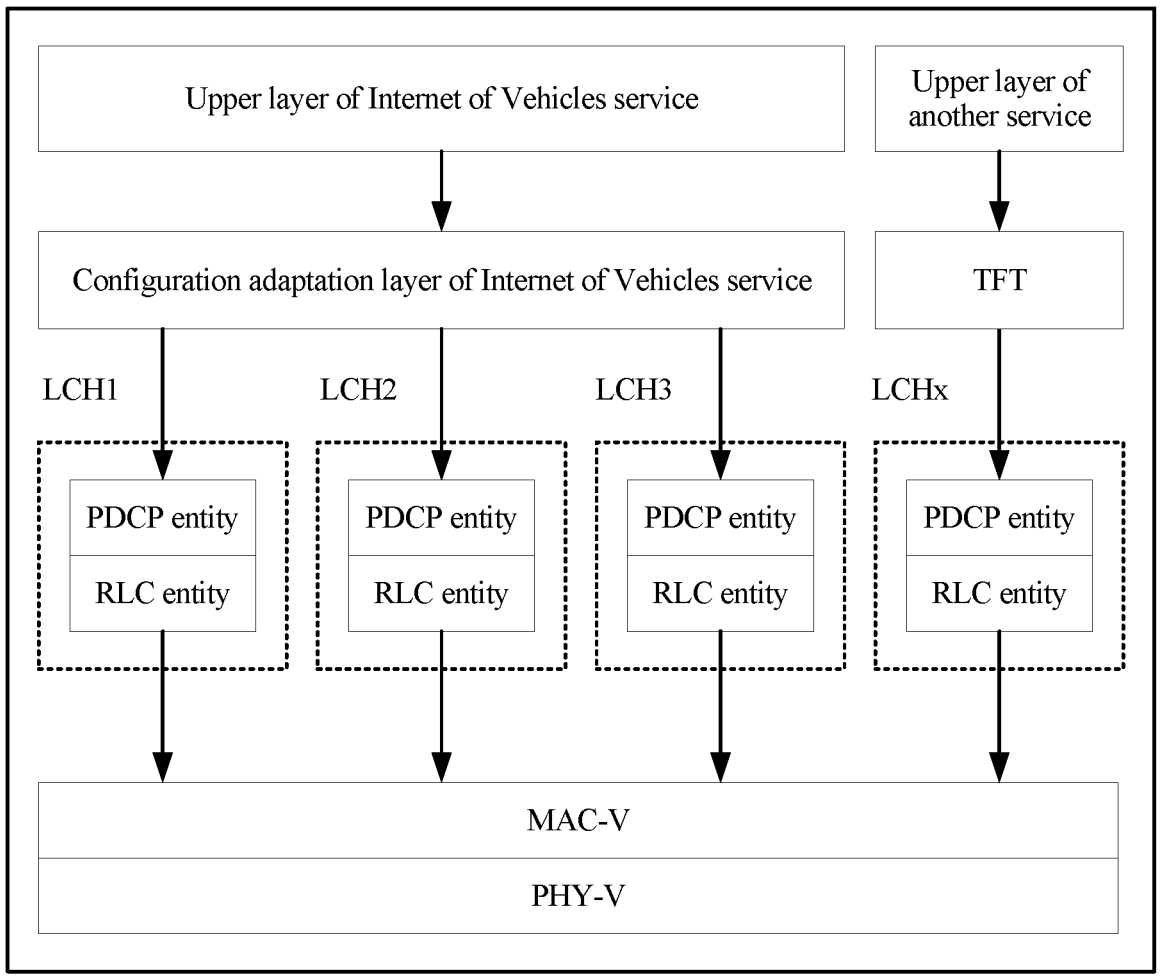
FIG. 9 is a schematic architectural diagram of another terminal according to an embodiment of the present invention.
Figure 10:
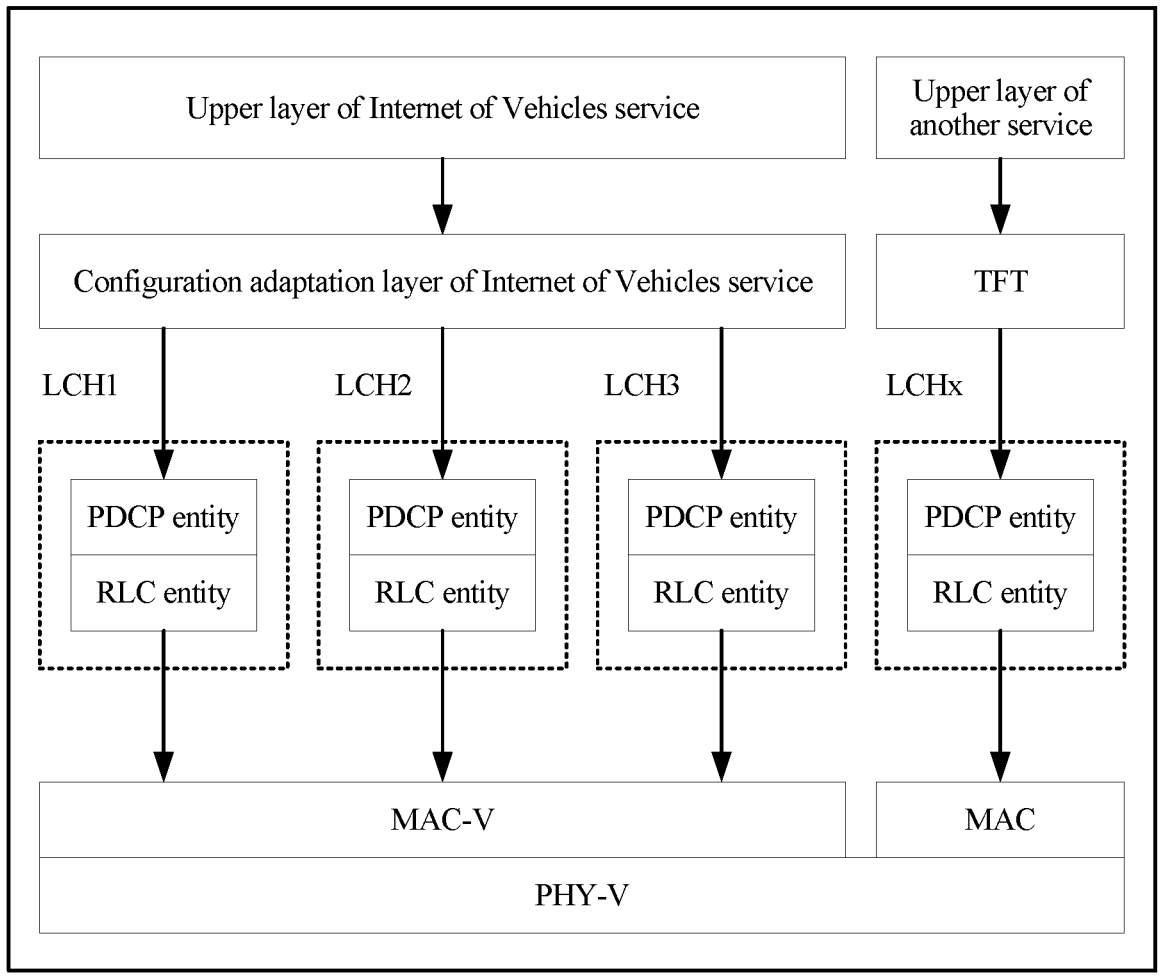
FIG. 10 is a schematic architectural diagram of another terminal according to an embodiment of the present invention.

Optionally, FIG. 9 is a schematic architectural diagram of another terminal according to an embodiment of the present invention. Referring to FIG. 9, the architecture provides an architecture form in which an architecture of an Internet of Vehicles service and an architecture of another service share a physical layer (PHY) and a MAC layer. FIG. 10 is a schematic architectural diagram of another terminal according to an embodiment of the present invention. Referring to FIG. 10, the architecture provides an architecture form in which an architecture of an Internet of Vehicles service and an architecture of another service share a physical layer (PHY). By using the architecture form of sharing the physical layer (PHY) and the MAC layer, or the architecture form of sharing the MAC layer, design can be simplified, and system complexity can be reduced.

Figure 11:
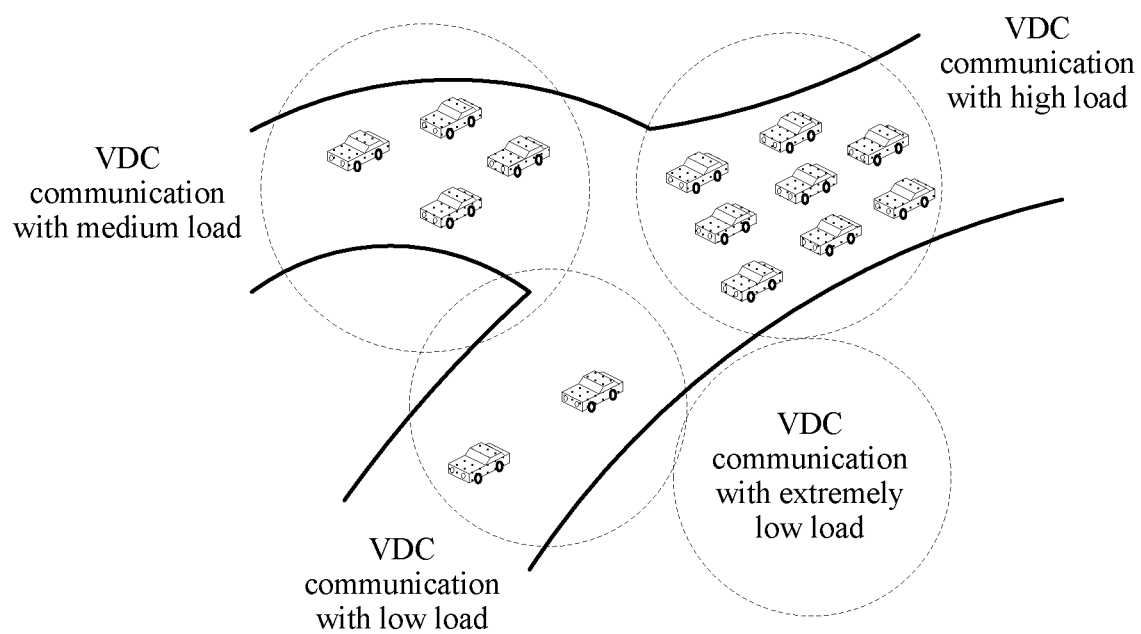
FIG. 11 is a schematic diagram of VDC spectrum load.

With development of the Internet of Vehicles and the LTE, a network architecture supporting both the Internet of Vehicles (such as VDC) and an LTE network appears. FIG. 11 is a schematic diagram of VDC spectrum load. Referring to FIG. 11, because of a moving stream of vehicles, VDC in different coverage areas have different spectrum load. In some areas with few vehicles (for example, a pedestrian street or a park), utilization of a VDC spectrum resource allocated by a network to the areas with few vehicles is not high. If both a VDC network and the LTE network are supported in such an area, a requirement for an LTE spectrum resource needs to be higher than a requirement for a VDC spectrum resource. In the prior art, the VDC spectrum resource and the LTE spectrum resource cannot be shared with each other, so that an idle VDC spectrum resource cannot be fully utilized, and utilization of a spectrum resource becomes low. Similarly, if LTE spectrum resource load is lower than VDC spectrum resource load, and a requirement for a VDC spectrum is higher than a requirement for an LTE spectrum resource, an idle LTE spectrum resource cannot be fully utilized, either, which causes low utilization of the LTE spectrum resource.

For the foregoing problem, the embodiments of the present invention further provide a spectrum resource allocation apparatus and method, to resolve a problem of relatively low utilization of a spectrum resource. The following describes the spectrum resource allocation apparatus and method based on specific embodiments.

Figure 12:
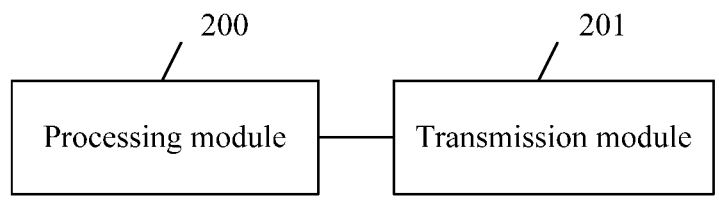
FIG. 12 shows a spectrum resource allocation apparatus according to an embodiment of the present invention.

FIG. 12 shows a spectrum resource allocation apparatus according to an embodiment of the present invention. The apparatus may be an evolved NodeB, including a processing module 200 and a transmission module 201.

The processing module 200 determines a VDC spectrum resource and an LTE spectrum resource according to load information of a VDC spectrum, and generates VDC spectrum communication information and LTE spectrum communication information according to the VDC spectrum resource and the LTE spectrum resource.

The transmission module 201 is configured to deliver the VDC spectrum communication information generated by the processing module 200 to a vehicle in a network coverage area, and deliver the LTE spectrum communication information generated by the processing module to user equipment UE in the network coverage area.

According to the spectrum resource allocation apparatus provided in this embodiment of the present invention, a processing module determines a VDC spectrum resource and an LTE spectrum resource according to load information of a VDC spectrum, and generates VDC spectrum communication information and LTE spectrum communication information according to the VDC spectrum resource and the LTE spectrum resource; and a transmission module delivers the VDC spectrum communication information generated by the processing module to a vehicle in a network coverage area, and delivers the LTE spectrum communication information generated by the processing module to user equipment UE in the network coverage area.

However, in the prior art, the VDC spectrum resource and the LTE spectrum resource are independently allocated. Therefore, when load of either of the VDC spectrum resource and the LTE spectrum resource is low, the resource cannot be shared to another system for use, which causes a resource waste.

However, in this embodiment of the present invention, the VDC spectrum resource and the LTE spectrum resource are determined according to the load information of the VDC spectrum, which implements a solution of adjusting resource allocation according to load, and increases resource utilization.

Preferably, the processing module 200 is specifically configured to allocate an idle VDC spectrum resource to LTE communication for use when load of the VDC vehicle communication is less than a VDC load threshold; or allocate an idle LTE spectrum resource to the VDC vehicle communication for use when a load of the VDC vehicle communication is greater than or equal to the VDC load threshold and load of LTE communication is less than an LTE load threshold. The foregoing two cases are merely examples given in the present invention, and any solution that can adjust a VDC resource and an LTE resource according to load shall fall within the protection scope of the present invention.

Specifically, the VDC spectrum communication information and the LTE spectrum communication information may be delivered in multiple manners. The following provides several possible implementation manners, and these manners are merely examples given in the present invention, and the present invention includes but is not limited to these manners.

Scenario 1: The transmission module 201 may specifically deliver the VDC spectrum communication information in any one of the following manners:

Manner 1: broadcasting the VDC spectrum communication information on an LTE spectrum and delivering the VDC spectrum communication information to the vehicle in the network coverage area; or Manner 2: receiving, on the LTE spectrum, a first access request message sent by the vehicle in the network coverage area, where the first access request message is used to request the VDC spectrum communication information; and sending, on the LTE spectrum, a first access response message to the vehicle in the network coverage area, where the first access response message includes the VDC spectrum communication information; or Manner 3: broadcasting first access information on the LTE spectrum, where the first access information is used to instruct the vehicle in the network coverage area to send the first access request message; receiving, on the LTE spectrum, the first access request message sent by the vehicle in the network coverage area; and sending, on the LTE spectrum, an access response message to the vehicle in the network coverage area, where the access response message includes the VDC spectrum communication information.

Scenario 2: The transmission module 201 may specifically deliver the VDC spectrum communication information on a VDC spectrum in any one of the following manners:

Manner 1: broadcasting the VDC spectrum communication information on the VDC spectrum and delivering the VDC spectrum communication information to the vehicle in the network coverage area; or Manner 2: receiving, on the VDC spectrum, a second access request message sent by the vehicle in the network coverage area, where the second access request message is used to request the VDC spectrum communication information; and sending, on the VDC spectrum, a second access response message to the vehicle in the network coverage area, where the second access response message includes the VDC spectrum communication information.

Scenario 3: The processing module is configured to divide the VDC spectrum communication information into two parts, that is, first-part VDC spectrum communication information and second-part VDC spectrum communication information. The transmission module 201 may specifically deliver the VDC spectrum communication information and the LTE spectrum communication information in any one of the following manners.

The VDC spectrum communication information includes the first-part VDC spectrum communication information and the second-part VDC spectrum communication information, and the first-part VDC spectrum communication information is used to instruct the vehicle in the network coverage area to obtain the second-part VDC spectrum communication information.

Specifically, in the scenario 3, there may be at least the following four manners.

Manner 1: Broadcasting the first-part VDC spectrum communication information on the LTE spectrum and delivering the first-part VDC spectrum communication information to the vehicle in the network coverage area; and broadcasting the second-part VDC spectrum communication information on the VDC spectrum and delivering the second-part VDC spectrum communication information to the vehicle in the network coverage area.

Specifically, in a possible implementation manner, the first-part VDC spectrum communication information is frequency channel number information of the VDC spectrum. After receiving the frequency channel number information, the vehicle performs synchronization according to the frequency channel number information and then receives the second-part VDC spectrum communication information. Certainly, this implementation manner is merely used as an example to describe the scenario 3, and the first-part VDC spectrum communication information and the second-part VDC spectrum communication information may be formed in another specific implementation manner, which is not limited in this embodiment.

Manner 2: Receiving, on the LTE spectrum, a third access request message sent by the vehicle in the network coverage area, where the third access request message is used to request the first-part VDC spectrum communication information; sending, on the LTE spectrum, a third access response message to the vehicle in the network coverage area, where the third access response message includes the first-part VDC spectrum communication information; and broadcasting the second-part VDC spectrum communication information on the VDC spectrum and delivering the second-part VDC spectrum communication information to the vehicle in the network coverage area.

Manner 3: Broadcasting the first-part VDC spectrum communication information on the LTE spectrum and delivering the first-part VDC spectrum communication information to the vehicle in the network coverage area; receiving, on the VDC spectrum, a fourth access request message sent by the vehicle in the network coverage area, where the fourth access request message is used to request the VDC spectrum communication information; and sending, on the VDC spectrum, a fourth access response message to the vehicle in the network coverage area, where the fourth access response message includes the VDC spectrum communication information.

Manner 4: Receiving, on the LTE spectrum, the third access request message sent by the vehicle in the network coverage area; sending, on the LTE spectrum, the third access response message to the vehicle in the network coverage area; receiving, on the VDC spectrum, the fourth access request message sent by the vehicle in the network coverage area; and sending, on the VDC spectrum, the fourth access response message sent by the vehicle in the network coverage area.

The VDC spectrum communication information at least includes frequency channel number information of the VDC spectrum communication, spectrum information of the VDC spectrum communication, and bandwidth information of the VDC spectrum communication.

Unless otherwise described, the spectrum resource allocation apparatus provided in this embodiment of the present invention uses only an eNB as an example, where the eNB supports both LTE communication and VDC communication.

It should be particularly noted that a purpose of the foregoing naming manners of the first, second, third, and fourth messages is to distinguish a sent or received message. For example, the third access request message mentioned in Manner 4 only represents a name of a message, and the first access request message and the second access request message are not necessarily before this message, which is an expression manner used in the present invention for ease of understanding the technical solution.

Figure 13:
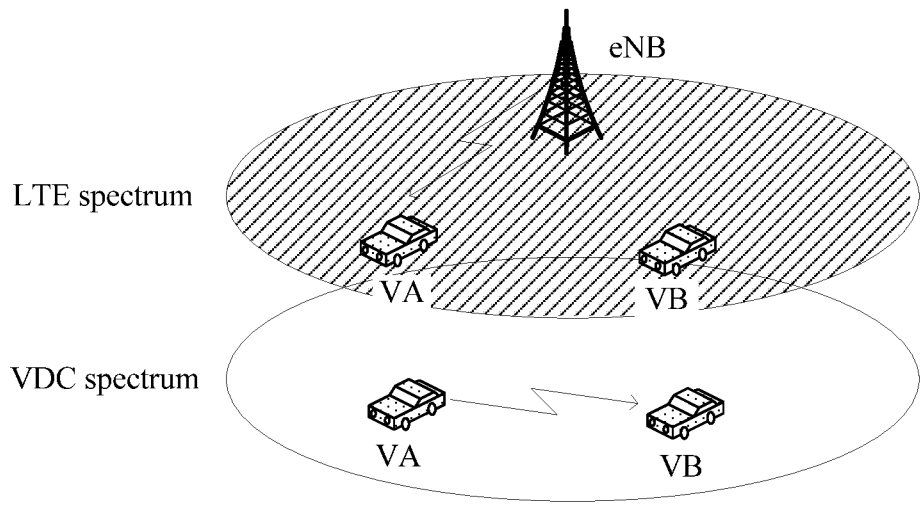
FIG. 13 is a schematic diagram of spectrum resource allocation according to an embodiment of the present invention.

FIG. 13 is a schematic diagram of spectrum resource allocation according to an embodiment of the present invention, where an eNB sends VDC spectrum communication information to a vehicle VA on an LTE spectrum, and the vehicle receives configuration information by using the LTE spectrum, so that a VDC spectrum resource can be saved, and a VDC spectrum communication capacity can be increased. A scenario shown in FIG. 13 is used as an example, and includes the following steps:

Step 1: A vehicle VA starts and is to send a VDC message to another vehicle, for example, a vehicle VB.

Step 2: The vehicle VA detects that the vehicle VA is currently in a coverage area of an eNB supporting LTE communication, and the vehicle VA receives VDC spectrum communication channel information sent by the eNB.

Optionally, the vehicle VA receives VDC spectrum communication channel information sent by the eNB in any one of the following manners, where the sending manners may include a broadcast manner, a unicast manner, or a combined manner of broadcast and unicast.

The broadcast manner: The eNB adds a system information block supporting VDC communication (VDC-SIB) into a system message, where the VDC-SIB is a system information block used to support Internet of Vehicles communication. The information block may include VDC spectrum communication channel information, where the VDC spectrum communication channel information specifically includes any one or any combination of the following parameters: an eNB-assisted VDC communication coverage indication, spectrum information of the VDC communication, a VDC spectrum communication type, a current load status of the VDC communication, and control information of the VDC communication.

The eNB-assisted VDC communication coverage indication indicates that a current area is a network-controlled VDC communication area.

The spectrum information of the VDC communication at least includes frequency channel number information of the VDC communication (for example, a frequency channel number 100) and bandwidth information of the VDC communication (for example, 10 MHz), or may include multiple VDC communication frequency channel numbers and bandwidth information (for example, a frequency channel number list).

The VDC spectrum communication type at least includes road safety (Road Safety) communication, non-road safety (non-Road Safety) communication. If the VDC-SIB indicates multiple pieces of spectrum information of the VDC communication, a communication type indication may be set for one or more pieces of spectrum information of the VDC communication.

The current load status of the VDC communication at least includes: a VDC contention channel load status (such as high load, medium load, and low load), a VDC scheduling channel load status (such as high load, medium load, and low load), a VDC channel overall load status (such as high load, medium load, and low load), and a quantity of vehicles and/or a quantity of special-purpose vehicles (for example, quantities of accident vehicles, ambulance vehicles, and vehicles carrying dangerous goods) served by a VDC channel.

The control information of the VDC communication at least includes: minimum transmit frequency of the VDC communication, maximum transmit frequency of the VDC communication, minimum transmit power of the VDC communication, maximum transmit power of the VDC communication, a power calculation compensation parameter of the VDC communication, a transmission format of the VDC communication, protocol information of the VDC communication, and a VDC communication information update message.

For the minimum transmit frequency of the VDC communication, for example, minimum transmit frequency of the VDC message is set for an accident-prone road section to reduce a probability of occurrence of a vehicle accident. Different minimum transmit frequency may be set for different types of VDC messages. For example, high frequency is set for an emergency crash avoidance message, and low frequency is set for a general vehicle location update message.

For the maximum transmit frequency of the VDC communication, for example, in an area with relatively dense vehicles, to prevent excessive VDC messages from consuming a VDC communication resource, maximum transmit frequency of the VDC message is set, so as to reduce resource overheads and ease contention of vehicles for resources. Different maximum transmit frequency may be set for different types of VDC messages. For example, high frequency is set for an emergency crash avoidance message, and low frequency is set for a general vehicle location update message.

The minimum transmit power of the VDC communication, for example, may be minimum transmit power of a vehicle, minimum transmit power of a type of message, and minimum transmit power of a message transmitted on a logical channel/a transmission queue.

The maximum transmit power of the VDC communication, for example, may be maximum transmit power of a vehicle, maximum transmit power of a type of message, and maximum transmit power of a message transmitted on a logical channel/a transmission queue.

The power calculation compensation parameter of the VDC communication may be a compensation value added during calculation of transmit power, and may be configured for a type of message, or configured for a logical channel/a transmission queue.

The transmission format (Transmission Format) of the VDC communication, for example, may be a modulation and coding scheme used in transmission, which may be QPSK, 16QAM, 64QAM, or the like; or may be a transmission rate, for example, 3 Mbps or 6 Mbps. A range of the transmission format is configured, for example, maximum MCS and/or minimum MCS, or a maximum rate and/or a minimum rate. The transmission format may be configured for a type of message, a logical channel, and a transmission queue.

The protocol information of the VDC communication, for example, may be European communications standard protocol information, American communications standard protocol information, or International Organization for Standardization, and/or protocol version information.

For the VDC communication information update message, for example, when VDC configuration changes, the eNB sends a configuration update message to UE in a coverage area of the eNB, and instructs a vehicle to obtain VDC communication information again. After receiving the message, the vehicle may directly read VDC communication information in a broadcast message and update previously obtained information, or may initiate an access process and obtain the VDC communication information from the eNB after successfully accessing the eNB.

The unicast manner: A vehicle may also obtain the foregoing information in the unicast manner. For example, when discovering that the VA is currently in coverage of the eNB, the VA initiates an access process. Optionally, an access message carries information indicating that current access is vehicle communication access; the access message carries information indicating a current vehicle type; and the access message carries information indicating a message type to be sent by the current vehicle, for example, an ambulance message or a firefighting message.

After receiving the access request, the eNB accepts the access request and sends a vehicle communication message to the accessed vehicle VA, and content of the message is the same as above.

The combined manner of broadcast and unicast: For example, if a vehicle learns, by means of reading in a broadcast manner, that a current area is a network-controlled VDC communication area, the vehicle initiates access to the eNB and obtains, in a unicast manner after successful access, VDC spectrum information, VDC control information, and the like that are sent by the base station. In addition, a part of the VDC information may be sent in the broadcast manner, for example, the VDC spectrum information is broadcast to the vehicle in the broadcast manner, while the VDC control information and the like are sent to the vehicle in the unicast manner after successful accessing by the vehicle.

Step 3: After obtaining the VDC communication information, the vehicle VA starts to transmit VDC message data to another vehicle on the VDC spectrum.

Figure 14:
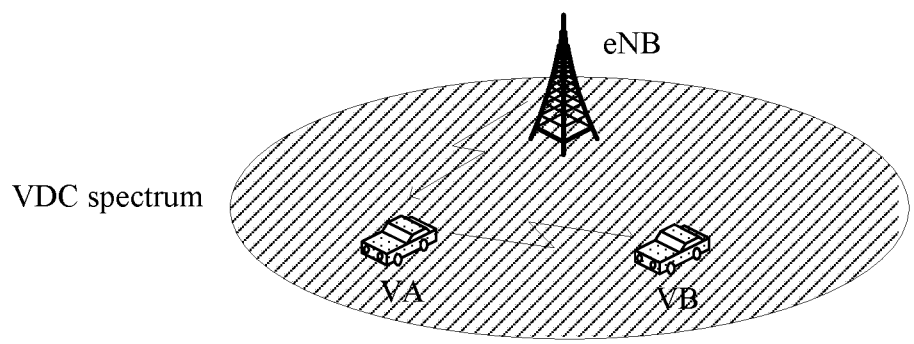
FIG. 14 is a schematic diagram of spectrum resource allocation according to an embodiment of the present invention.

FIG. 13 provides an implementation manner in which an eNB sends VDC spectrum communication information on an LTE spectrum. Apparently, the eNB may also send the VDC spectrum communication information on a VDC spectrum. FIG. 14 is a schematic diagram of spectrum resource allocation according to an embodiment of the present invention, where an eNB sends VDC communication information to a vehicle VA on a VDC spectrum, so that the vehicle can obtain a communication configuration (for example, VDC spectrum communication channel information) only by monitoring and receiving data of the VDC spectrum; a channel for obtaining configuration information and a communication channel belong to a same spectrum, which reduces design complexity of an onboard device. Referring to FIG. 14, in the foregoing embodiment corresponding to the figure, the vehicle VA obtains the VDC spectrum communication information by using the LTE spectrum, but actually, the eNB may also use only the VDC spectrum and may send the VDC communication information to the vehicle VA in the following manner.

An independent VDC channel information channel or VDC communication resource is divided from the VDC spectrum, and the eNB broadcasts the VDC communication information (content of the information is same as above) on the channel.

Figure 15:
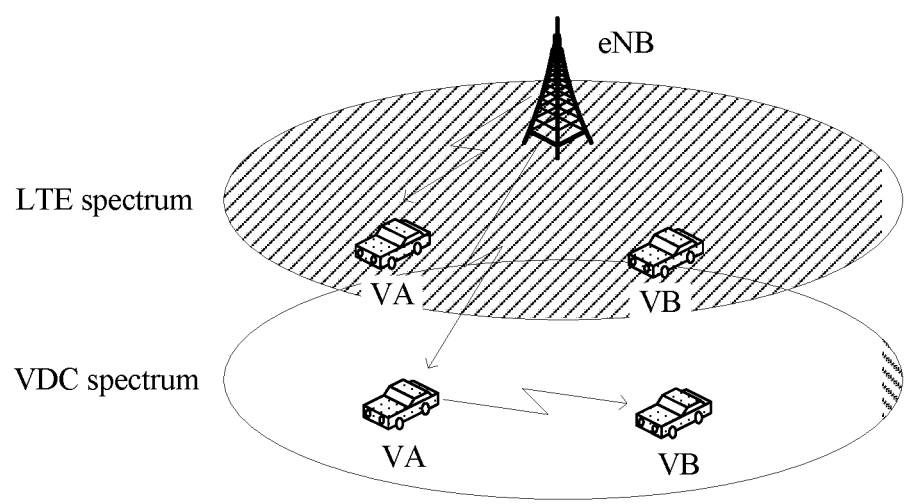
FIG. 15 is a schematic diagram of spectrum resource allocation according to an embodiment of the present invention.

FIG. 13 provides an implementation manner in which an eNB sends VDC spectrum communication information on an LTE spectrum. FIG. 14 provides an implementation manner in which an eNB performs sending on a VDC spectrum. Another implementation manner is that the eNB sends the VDC spectrum communication information by using the LTE spectrum and the VDC spectrum. FIG. 15 is a schematic diagram of spectrum resource allocation according to an embodiment of the present invention, where the eNB sends VDC communication information to the vehicle VA by using the LTE spectrum and the VDC spectrum, which can better balance load of the LTE and the VDC for sending configuration information. Key information of discovery and access of a VDC network is sent by using the LTE, and other configuration information is sent by using the VDC network, so that a data amount consumed when the LTE sends the configuration information is reduced. Referring to FIG. 15, specifically, the vehicle VA may obtain a part of communication information, such as frequency channel number information and channel bandwidth, of a VDC system by using the eNB, and receives VDC communication information, such as VDC control information, on the VDC spectrum according to the communication information of the VDC system. That is, a part of the VDC communication information is obtained by using the LTE spectrum, and a part of the VDC communication information is obtained by using the VDC spectrum.

It should be noted that the eNB in the foregoing embodiment may use a structure shown in FIG. 12, and implement a function and a technical effect of the embodiment corresponding to FIG. 12.

Figure 16:
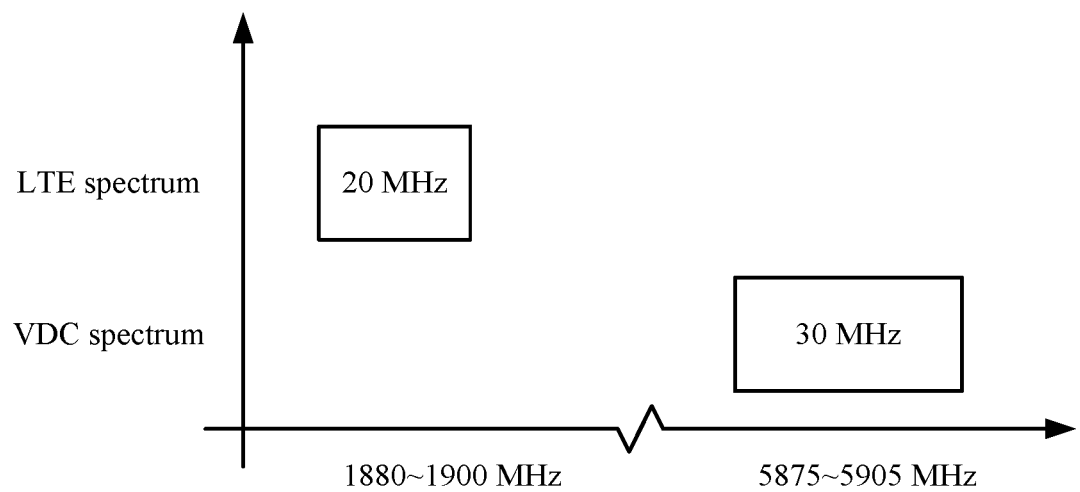
FIG. 16 and FIG. 17 are schematic diagrams of dynamic spectrum sharing of an LTE spectrum resource and a VDC spectrum resource according to an embodiment of the present invention.
Figure 17:
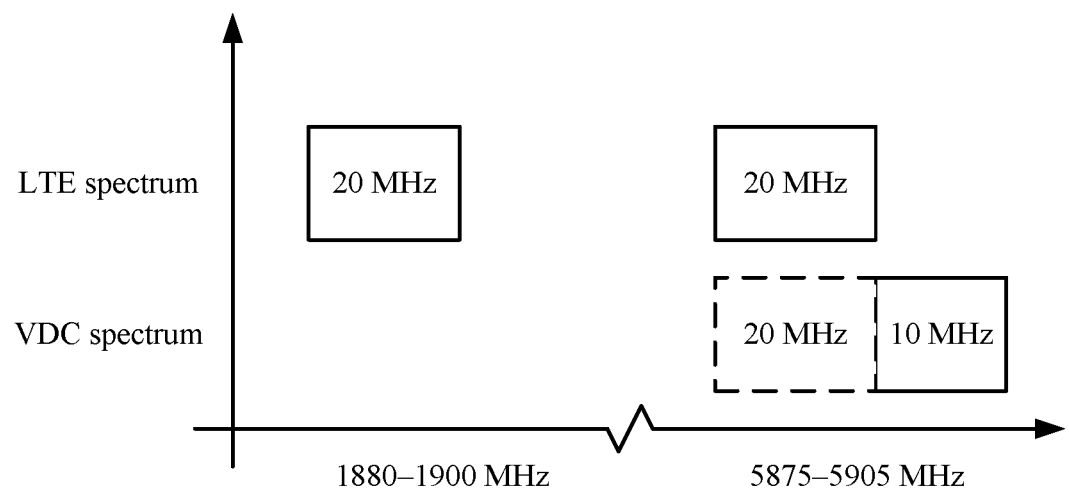

Preferably, FIG. 16 and FIG. 17 are schematic diagrams of dynamic spectrum sharing of an LTE spectrum resource and a VDC spectrum resource according to an embodiment of the present invention. By using a case in the FIG. 16 and FIG. 17 as an example, a sharing mechanism includes the following steps:

Step 1: LTE and VDC use respective dedicated frequency bands, where an LTE frequency band provides communication between user equipment (User Equipment, UE for short) and an eNB, or service communication between UE and UE; and a VDC frequency band is used in a communication service between vehicles or between a vehicle and a network. For example, in FIG. 16, the LTE spectrum occupies 20 MHz, and the VDC spectrum occupies 30 MHz bandwidth.

Step 2: The eNB determines, according to a VDC communication requirement, a spectrum allocated to VDC communication. The eNB may estimate a load status of VDC vehicle communication in a coverage area according to vehicle communication statistical information in the network coverage area in a network planning phase; or the eNB dynamically obtains a current load status of the VDC spectrum. For an obtaining method, refer to the foregoing embodiment. Certainly, the foregoing manners are merely examples given in the present invention, and the present invention includes but is not limited to the cases mentioned above.

Specifically, referring to FIG. 17, if the eNB determines that VDC load is relatively low, the eNB may re-allocate a VDC communication spectrum. Referring to FIG. 17, for example, if a 30 MHz spectrum is allocated to the VDC communication, but actually only 10 MHz is required, a 20 MHz VDC spectrum is allocated to the LTE communication, and only 10 MHz is reserved and allocated to the VDC communication for use.

Step 3: After determining the VDC communication spectrum, the eNB notifies VDC spectrum information to a vehicle in the network coverage area of the eNB.

Step 4: The eNB uses the VDC spectrum divided from the VDC spectrum as an LTE resource, and allocates the LTE resource to UE in the network coverage area of the eNB for use of LTE communication. The allocation manner is at least any one of the following:

the divided VDC spectrum is divided into one or more single carriers, the single carrier is configured for the UE, and by using a carrier aggregation technology, downlink data is sent from the eNB to the UE on the carrier, or uplink data is sent from the UE to the eNB on the carrier, so that an idle spectrum is used as a candidate carrier of the carrier aggregation technology for an LTE user, and in the carrier aggregation technology, multiple carriers are aggregated for one UE to increase a throughput of the single UE (User Equipment, user equipment); or the divided VDC spectrum is divided into one or more single carriers, and an independent LTE cell is established based on the single carrier, so that an independent cell is established by using a spatial spectrum, and an LTE UE can communicate with an LTE network by using the newly established cell; when having no service transmission requirement, the UE may camp on an LTE cell established by using the VDC spectrum; and when the UE has a service transmission requirement, the UE may initiate access to an eNB that manages the LTE cell established by using the VDC spectrum, and receive data of the eNB in the service cell, or sends data to the eNB; or the VDC spectrum communication information may be not only sent to an onboard device that communicates by using the VDC spectrum, but also sent to all UEs that communicate in the LTE network; the LTE spectrum communication information is sent to the LTE UE. Specifically, all the UEs that communicate in the LTE network may be terminal devices held by pedestrians or terminal devices held by passengers on a vehicle. Further, the foregoing vehicle represents UE disposed on the vehicle, and the vehicle herein includes but is not limited to a car, a motorcycle, a bike, a pedestrian, a special-purpose vehicle (OBD), or the like. The UE that communicates by using the LTE may also be used as a road safety terminal device, so that the communication information may also be sent to a common LTE terminal.

Figure 18:
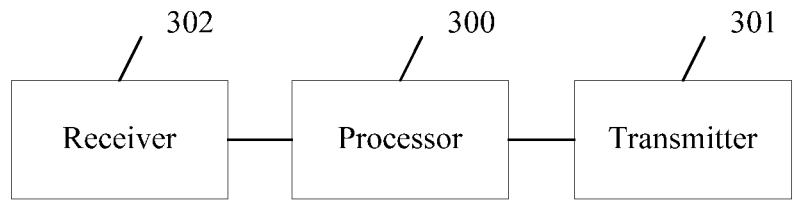
FIG. 18 shows another apparatus for transmitting data in a wireless network according to an embodiment of the present invention.

FIG. 18 shows an apparatus for transmitting data in a wireless network according to an embodiment of the present invention. Referring to FIG. 18, the apparatus includes: a processor 300, a transmitter 301, and a receiver 302.

Specifically, the processor 300 is corresponding to the processing module 100 in FIG. 3 or FIG. 4 and can perform a corresponding function of the processing module 100 in FIG. 3 or FIG. 4 to implement a corresponding technical effect. The transmitter 301 is corresponding to the sending module 101 in FIG. 3 or FIG. 4 and can perform a corresponding function of the sending module 101 in FIG. 3 or FIG. 4 to implement a corresponding technical effect. The receiver 302 is corresponding to the receiving module 102 in FIG. 4 and can perform a corresponding function of the receiving module 102 in FIG. 4 to implement a corresponding technical effect.

Figure 19:
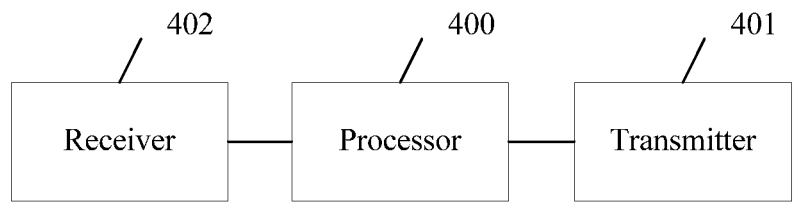
FIG. 19 shows another spectrum resource allocation apparatus according to an embodiment of the present invention.

FIG. 19 shows another spectrum resource allocation apparatus according to an embodiment of the present invention. Referring to FIG. 19, the apparatus includes: a processor 400, a transmitter 401, and a receiver 402.

Specifically, the processor 400 is corresponding to the processing module 200 in FIG. 12 and can perform a corresponding function of the processing module 200 in FIG. 12 to implement a corresponding technical effect. The transmitter 401 is corresponding to the transmission module 201 in FIG. 12 and can perform a corresponding function of the transmission module 201 in FIG. 12 to implement a corresponding technical effect. The receiver 402 is corresponding to the transmission module 201 in FIG. 12 and can perform a corresponding function of the receiving module 202 in FIG. 3 to implement a corresponding technical effect.

Figure 20:
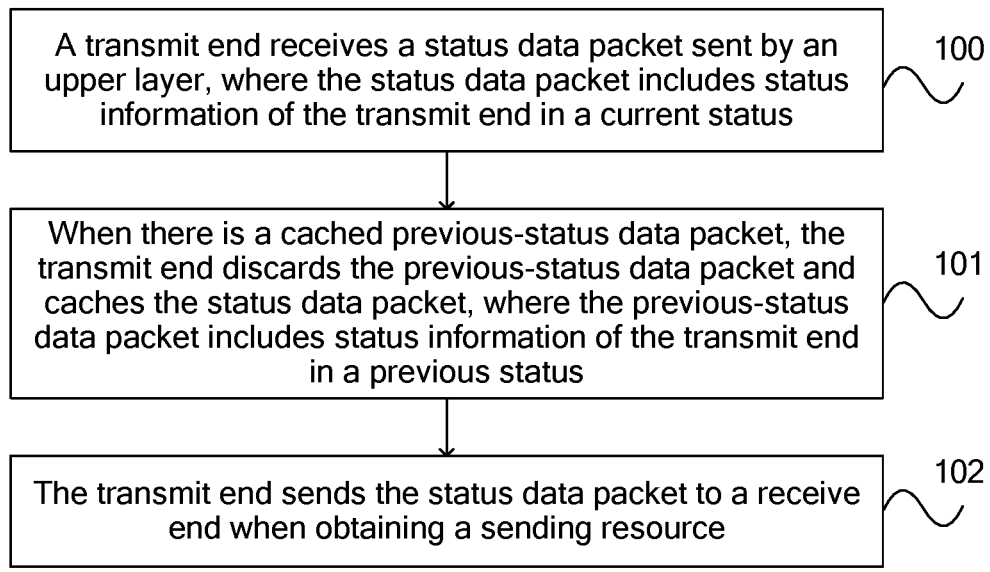
FIG. 20 is a schematic flowchart of a method for transmitting data in a wireless network according to an embodiment of the present invention.

FIG. 20 is a schematic flowchart of a method for transmitting data in a wireless network according to an embodiment of the present invention. The method is executed by an apparatus for transmitting data in a wireless network, and the apparatus may use the foregoing structure shown in FIG. 3, FIG. 4, or FIG. 18, and perform a function in FIG. 3, FIG. 4, or FIG. 18 to implement a corresponding technical effect. Referring to FIG. 12, the method includes the following steps:

Step 100: A transmit end receives a status data packet sent by an upper layer, where the status data packet includes status information of the transmit end in a current status.

Step 101: When there is a cached previous-status data packet, the transmit end discards the previous-status data packet and caches the status data packet, where the previous-status data packet includes status information of the transmit end in a previous status.

Step 102: The transmit end sends the status data packet to a receive end when obtaining a sending resource.

The previous-status data packet and the status data packet have a same feature.

According to the method for transmitting data in a wireless network provided in this embodiment, a transmit end receives a status data packet sent by an upper layer, where the status data packet includes status information of the transmit end in a current status; when there is a cached previous-status data packet, the transmit end discards the previous-status data packet and caches the status data packet, where the previous-status data packet includes status information of the transmit end in a previous status; and the transmit end sends the status data packet to a receive end when obtaining a sending resource, where the previous-status data packet and the status data packet have a same feature. When applied to an Internet of Vehicles scenario, the method can avoid a delay in data exchange between vehicles, and update vehicle traveling data in time, thereby improving vehicle driving safety. In addition, a resource can be saved because the transmit end no longer needs to send the previous-status data packet to the receive end.

Preferably, the feature of the status data packet includes any one or any combination of the following parameters: a data flow identifier of the status data packet, a type of the status data packet, an event identifier corresponding to the status data packet, and a transmit end action identifier.

Figure 21:
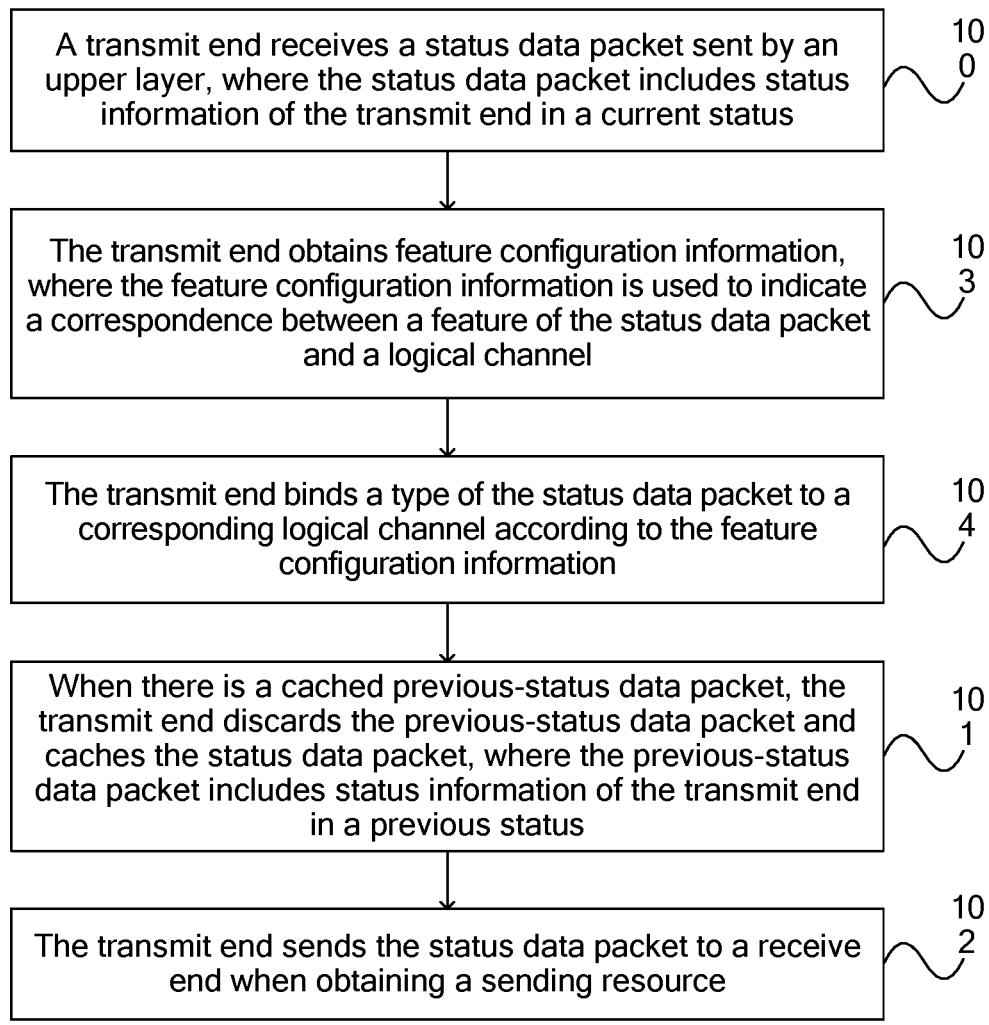
FIG. 21 is a schematic flowchart of another method for transmitting data in a wireless network according to an embodiment of the present invention.

On the basis of FIG. 20, FIG. 21 is a schematic flowchart of another method for transmitting data in a wireless network according to an embodiment of the present invention. Referring to FIG. 21, before step 101, the method further includes the following steps:

Step 103: The transmit end obtains feature configuration information, where the feature configuration information is used to indicate a correspondence between a feature of the status data packet and a logical channel.

Step 104: The transmit end binds a type of the status data packet to a corresponding logical channel according to the feature configuration information.

Step 103 includes the following two possible implementation manners:

Manner 1: The transmit end presets the feature configuration information; or

Manner 2: The transmit end receives the feature configuration information sent by a base station.

Optionally, before step 103, in which the transmit end obtains the feature configuration information, the method further includes the following steps:

Step 105: The transmit end receives a capability query message sent by the base station, where the capability query message is used to query whether the transmit end has a function of binding the feature of the status data packet to the corresponding logical channel, and/or a function of supporting, by the corresponding logical channel, the transmit end in discarding the previous-status data packet.

Step 106: The transmit end sends a capability query response message, where the capability query response message includes a supported function indication, and the supported function indication is used to indicate that the transmit end has the function.

It should be noted that step 105 and step 106 are not shown in the figure.

Figure 22:
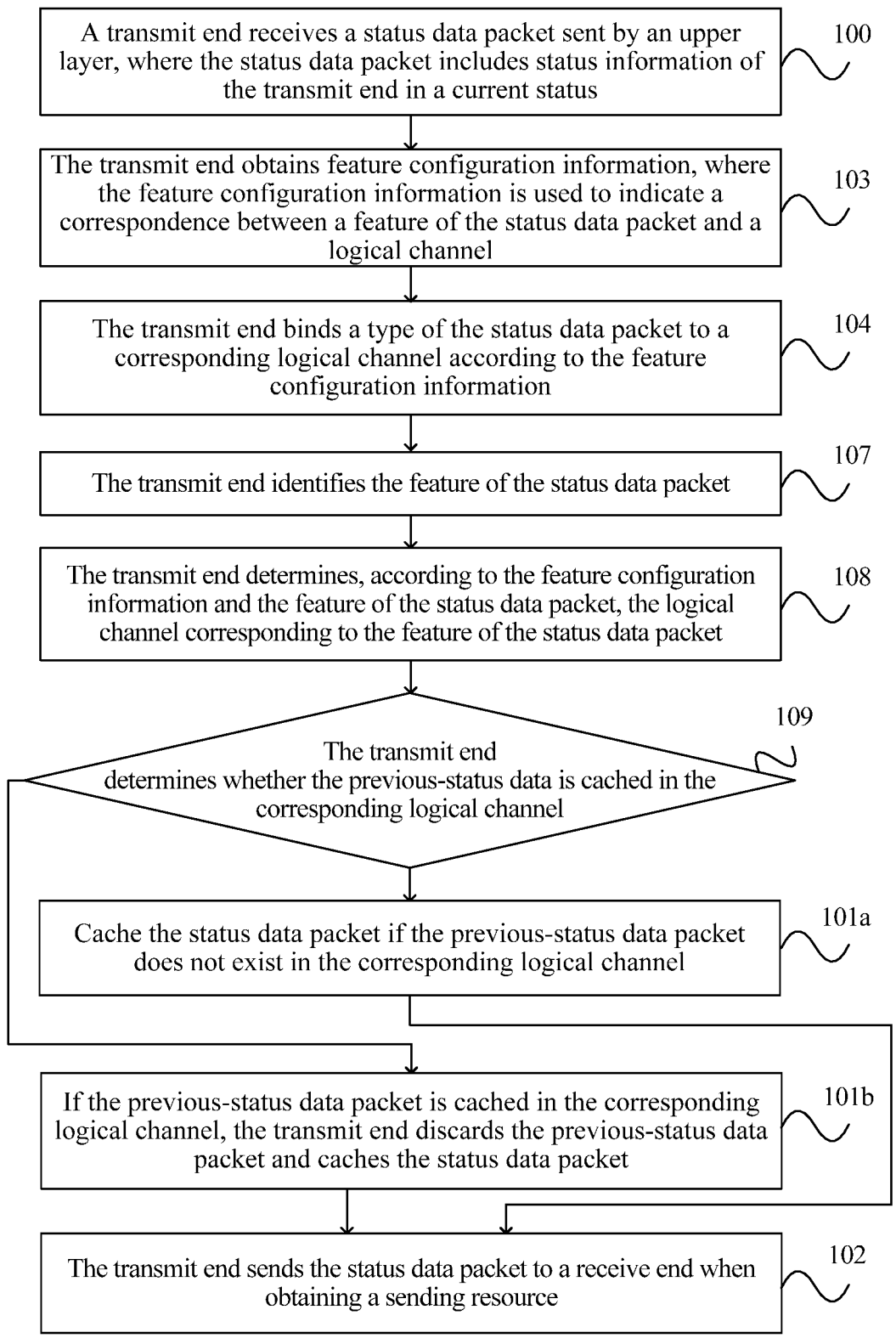
FIG. 22 is a schematic flowchart of another method for transmitting data in a wireless network according to an embodiment of the present invention.

Preferably, on the basis of FIG. 21, FIG. 22 is a schematic flowchart of another method for transmitting data in a wireless network according to an embodiment of the present invention. Referring to FIG. 22, after step 104, the method further includes the following steps:

Step 107: The transmit end identifies the feature of the status data packet.

Step 108: The transmit end determines, according to the feature configuration information and the feature of the status data packet, the logical channel corresponding to the feature of the status data packet.

Step 109: The transmit end determines whether the previous-status data is cached in the corresponding logical channel.

Step 101a: Cache the status data packet if the previous-status data packet does not exist in the corresponding logical channel.

Step 101b: If the previous-status data packet is cached in the corresponding logical channel, the transmit end discards the previous-status data packet and caches the status data packet.

Figure 23:
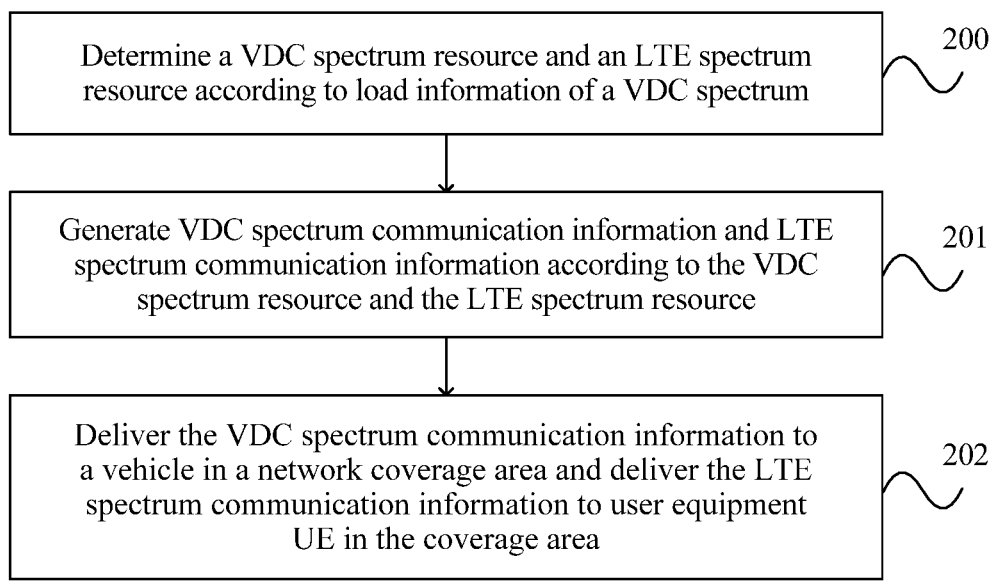
FIG. 23 is a schematic flowchart of a spectrum resource allocation method according to an embodiment of the present invention.

FIG. 23 is a schematic flowchart of a spectrum resource allocation method according to an embodiment of the present invention. The method is executed by a spectrum resource allocation apparatus, and the apparatus may use the foregoing structure shown in FIG. 12, FIG. 13, or FIG. 19 and perform a function in FIG. 12, FIG. 13, or FIG. 19 to implement a corresponding technical effect. Referring to FIG. 23, the method includes the following steps:

Step 200: Determine a VDC spectrum resource and an LTE spectrum resource according to load information of a VDC spectrum.

Step 201: Generate VDC spectrum communication information and LTE spectrum communication information according to the VDC spectrum resource and the LTE spectrum resource.

Step 202: Deliver the VDC spectrum communication information to a vehicle in a network coverage area and deliver the LTE spectrum communication information to user equipment UE in the network coverage area.

According to the spectrum resource allocation method provided in this embodiment of the present invention, a VDC spectrum resource and an LTE spectrum resource are determined according to load information of a VDC spectrum, and VDC spectrum communication information and LTE spectrum communication information are generated according to the VDC spectrum resource and the LTE spectrum resource; and the VDC spectrum communication information is delivered to a vehicle in a network coverage area, and the LTE spectrum communication information is delivered to user equipment UE in the network coverage area.

However, in the prior art, the VDC spectrum resource and the LTE spectrum resource are independently allocated. Therefore, when load of either of the VDC spectrum resource and the LTE spectrum resource is low, the resource cannot be shared to another system for use, which causes a resource waste.

However, in this embodiment of the present invention, the VDC spectrum resource and the LTE spectrum resource are determined according to the load information of the VDC spectrum, which implements a solution of adjusting resource allocation according to load, and increases resource utilization.

Preferably, step 200 at least includes the following possible implementation manners:

Manner 1: Allocating an idle VDC spectrum resource to LTE communication for use when load of the VDC vehicle communication is less than a VDC load threshold; or Manner 2: Allocating an idle LTE spectrum resource to the VDC vehicle communication for use when a load of the VDC vehicle communication is greater than or equal to the VDC load threshold and load of LTE communication is less than an LTE load threshold.

Specifically, there may be multiple delivering manners in step 202, and the following provides several possible implementation manners:

Scenario 1: The spectrum resource allocation apparatus delivers the VDC spectrum communication information on an LTE spectrum;

broadcasting the VDC spectrum communication information on an LTE spectrum and delivering the VDC spectrum communication information to the vehicle in the network coverage area; or receiving, on the LTE spectrum, a first access request message sent by the vehicle in the network coverage area, where the first access request message is used to request the VDC spectrum communication information; and sending, on the LTE spectrum, a first access response message to the vehicle in the network coverage area, where the first access response message includes the VDC spectrum communication information; or broadcasting first access information on the LTE spectrum, where the first access information is used to instruct the vehicle in the network coverage area to send the first access request message;

receiving, on the LTE spectrum, the first access request message sent by the vehicle in the network coverage area; and sending, on the LTE spectrum, an access response message to the vehicle in the network coverage area, where the access response message includes the VDC spectrum communication information.

Scenario 2: The spectrum resource allocation apparatus delivers the VDC spectrum communication information on a VDC spectrum;

broadcasting the VDC spectrum communication information on the VDC spectrum and delivering the VDC spectrum communication information to the vehicle in the network coverage area; or receiving, on the VDC spectrum, a second access request message sent by the vehicle in the network coverage area, where the second access request message is used to request the VDC spectrum communication information; and sending, on the VDC spectrum, a second access response message to the vehicle in the network coverage area, where the second access response message includes the VDC spectrum communication information.

Scenario 3: The spectrum resource allocation apparatus divides the VDC spectrum communication information into two parts, which are respectively delivered on the VDC spectrum and the LTE spectrum.

The VDC spectrum communication information includes first-part VDC spectrum communication information and second-part VDC spectrum communication information, and the first-part VDC spectrum communication information is used to instruct the vehicle in the network coverage area to obtain the second-part VDC spectrum communication information.

The delivering the VDC spectrum communication information to a vehicle in a network coverage area includes:

broadcasting the first-part VDC spectrum communication information on an LTE spectrum and delivering the first-part VDC spectrum communication information to the vehicle in the network coverage area; and broadcasting the second-part VDC spectrum communication information on the VDC spectrum and delivering the second-part VDC spectrum communication information to the vehicle in the network coverage area; or receiving, on the LTE spectrum, a third access request message sent by the vehicle in the network coverage area, where the third access request message is used to request the first-part VDC spectrum communication information;

sending, on the LTE spectrum, a third access response message to the vehicle in the network coverage area, where the third access response message includes the first-part VDC spectrum communication information; and broadcasting the second-part VDC spectrum communication information on the VDC spectrum and delivering the second-part VDC spectrum communication information to the vehicle in the network coverage area; or broadcasting the first-part VDC spectrum communication information on the LTE spectrum and delivering the first-part VDC spectrum communication information to the vehicle in the network coverage area; and receiving, on the VDC spectrum, a fourth access request message sent by the vehicle in the network coverage area, where the fourth access request message is used to request the VDC spectrum communication information; and sending, on the VDC spectrum, a fourth access response message to the vehicle in the network coverage area, where the fourth access response message includes the VDC spectrum communication information; or receiving, on the LTE spectrum, the third access request message sent by the vehicle in the network coverage area;

sending, on the LTE spectrum, the third access response message to the vehicle in the network coverage area;

receiving, on the VDC spectrum, the fourth access request message sent by the vehicle in the network coverage area; and sending, on the VDC spectrum, the fourth access response message to the vehicle in the network coverage area.

Preferably, the VDC spectrum communication information at least includes frequency channel number information of the VDC spectrum communication, spectrum information of the VDC spectrum communication, and bandwidth information of the VDC spectrum communication.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. An apparatus for transmitting data in a wireless network, comprising:
 a receiver configured to receive, from an upper layer, a status data packet comprising current status information of a transmit end and a first feature;
 a processor configured to:
   determine whether a second feature of a previous-status data packet that is cached in a buffer and the first feature of the status data packet are a same feature, wherein the previous-status data packet comprises previous status information of the transmit end and the second feature; and
   discard, in response to determining that the second feature and the first feature are the same feature, the previous-status data packet from the buffer, and cache the status data packet in the buffer; and
 a transmitter configured to:
   obtain a sending resource; and
   send, to a receive end, the status data packet using the sending resource.

2. The apparatus according to claim 1, wherein the first feature of the status data packet comprises a data flow identifier of the status data packet, a type of the status data packet, an event identifier corresponding to the status data packet, or a transmit end action identifier.

3. The apparatus according to claim 2, wherein:
 the receiver is further configured to receive, from a base station, a capability query message querying whether the transmit end has a first function of binding the first feature of the status data packet to a corresponding logical channel, or whether the transmit end has a second function of supporting, by the corresponding logical channel, the transmit end in discarding the previous-status data packet; and the transmitter is further configured to send a capability query response message comprising a supported function indication indicating whether the transmit end has the first function or the second function.

4. The apparatus according to claim 1, wherein, before discarding the previous-status data packet and caching the status data packet, the processor is further configured to:
 obtain feature configuration information; and
 bind a type of the status data packet to a corresponding logical channel according to the feature configuration information, wherein the feature configuration information indicates a correspondence between the first feature of the status data packet and the corresponding logical channel.

5. The apparatus according to claim 4, wherein:
 the processor is further configured to preset the feature configuration information; or
 the receiver is further configured to receive, from a base station, the feature configuration information.

6. The apparatus according to claim 5, wherein the processor is further configured to:
 identify the first feature of the status data packet;
 determine, according to the feature configuration information and the first feature of the status data packet, the corresponding logical channel corresponding to the first feature of the status data packet; and
 determine whether the previous-status data packet is cached in the corresponding logical channel, wherein when the previous-status data packet does not exist in the corresponding logical channel, the status data packet is cached, or when the previous-status data packet is cached in the corresponding logical channel, the transmit end discards the previous-status data packet and caches the status data packet.

7. A method for transmitting data in a wireless network, comprising:
 receiving, by a transmit end from an upper layer, a status data packet comprising current status information of the transmit end and a first feature;
 determining, by the transmit end, whether a second feature of a previous-status data packet and the first feature of the status data packet are a same feature, wherein the previous-status data packet comprises previous status information of the transmit end and the second feature, and wherein the previous-status data packet is cached in a buffer of the transmit end;
 discarding, by the transmit end, in response to determining that the second feature and the first feature are the same feature, the previous-status data packet from the buffer, and caching the status data packet in the buffer; and
 sending, by the transmit end to a receive end, the status data packet using a sending resource obtained by the transmit end.

8. The method according to claim 7, wherein the first feature of the status data packet comprises a data flow identifier of the status data packet, a type of the status data packet, an event identifier corresponding to the status data packet, or a transmit end action identifier.

9. The method according to claim 7, wherein, before discarding the previous-status data packet and caching the status data packet, the method further comprises:
 obtaining, by the transmit end, feature configuration information, wherein the feature configuration information indicates a correspondence between the first feature of the status data packet and a corresponding logical channel; and binding, by the transmit end, a type of the status data packet to the corresponding logical channel according to the feature configuration information.

10. The method according to claim 9, wherein obtaining the feature configuration information comprises:
presetting, by the transmit end, the feature configuration information; or
receiving, by the transmit end from a base station, the feature configuration information.

11. The method according to claim 10, wherein, after binding the type of the status data packet to the corresponding logical channel, the method further comprises:
identifying, by the transmit end, the first feature of the status data packet;
determining, by the transmit end, according to the feature configuration information and the first feature of the status data packet, the corresponding logical channel corresponding to the first feature of the status data packet; and
determining, by the transmit end, whether the previous-status data packet is cached in the corresponding logical channel, wherein
when the previous-status data packet does not exist in the corresponding logical channel, the status data packet is cached; or
when the previous-status data packet is cached in the corresponding logical channel, the transmit end discards the previous-status data packet and caches the status data packet.

12. The method according to claim 9, wherein, before obtaining the feature configuration information, the method further comprises:
receiving, by the transmit end from a base station, a capability query message querying whether the transmit end has a first function of binding the first feature of the status data packet to the corresponding logical channel, or whether the transmit end has a second function of supporting, by the corresponding logical channel, the transmit end in discarding the previous-status data packet; and
sending, by the transmit end, a capability query response message comprising a supported function indication indicating whether the transmit end has the first function or the second function.

13. A non-transitory computer-readable media storing computer instructions that, when executed by one or more processors, cause the one or more processors to perform operations comprising:
receiving, from an upper layer, a status data packet comprising a first feature and current status information of a transmit end;
determining whether a second feature of a previous-status data packet and the first feature of the status data packet are a same feature, wherein the previous-status data packet comprises previous status information of the transmit end and the second feature, and wherein the previous-status data packet is cached in a buffer of the transmit end;
discarding, in response to determining that the second feature and the first feature are the same feature, the previous-status data packet from the buffer, and caching the status data packet in the buffer; and
sending, to a receive end, the status data packet using a sending resource obtained by the transmit end.

14. The non-transitory computer-readable media of claim 13, wherein the first feature of the status data packet comprises a data flow identifier of the status data packet, a type of the status data packet, an event identifier corresponding to the status data packet, or a transmit end action identifier.

15. The non-transitory computer-readable media of claim 13, wherein the operations further comprise:
obtaining feature configuration information, wherein the feature configuration information indicates a correspondence between the first feature of the status data packet and a corresponding logical channel; and
binding a type of the status data packet to the corresponding logical channel according to the feature configuration information.

16. The non-transitory computer-readable media of claim 15, wherein obtaining the feature configuration information comprises:
presetting the feature configuration information; or
receiving, from a base station, the feature configuration information.

17. The non-transitory computer-readable media of claim 16, wherein the operations further comprise:
identifying the first feature of the status data packet;
determining, according to the feature configuration information and the first feature of the status data packet, the corresponding logical channel corresponding to the first feature of the status data packet; and
determining, by the transmit end, whether the previous-status data packet is cached in the corresponding logical channel, wherein when the previous-status data packet does not exist in the corresponding logical channel, the status data packet is cached, or when the previous-status data packet is cached in the corresponding logical channel, the transmit end discards the previous-status data packet and caches the status data packet.

18. The non-transitory computer-readable media of claim 15, wherein the operations further comprise:
receiving, from a base station, a capability query message querying whether the transmit end has a first function of binding the first feature of the status data packet to the corresponding logical channel, or whether the transmit end has a second function of supporting, by the corresponding logical channel, the transmit end in discarding the previous-status data packet; and
sending, by the transmit end, a capability query response message comprising a supported function indication indicating whether the transmit end has the first function or the second function.

\* \* \* \* \*